US011695450B2

(12) United States Patent
Blaser et al.

(10) Patent No.: US 11,695,450 B2
(45) Date of Patent: Jul. 4, 2023

(54) METHODS AND APPARATUSES FOR WIRELESS AND NON-CONDUCTIVE POWER AND DATA TRANSFERS WITH ELECTRONIC DEVICES

(71) Applicant: Mobile Tech, Inc., Hillsboro, OR (US)

(72) Inventors: Robert Logan Blaser, Hillsboro, OR (US); Michael D. Miles, Hillsboro, OR (US); Lincoln Wilde, Hillsboro, OR (US); Wade Wheeler, Hillsboro, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 0 days.

(21) Appl. No.: 17/426,609

(22) PCT Filed: Jan. 30, 2020

(86) PCT No.: PCT/US2020/015914
§ 371 (c)(1),
(2) Date: Jul. 28, 2021

(87) PCT Pub. No.: WO2020/160290
PCT Pub. Date: Aug. 6, 2020

(65) Prior Publication Data
US 2022/0140653 A1    May 5, 2022

Related U.S. Application Data

(60) Provisional application No. 62/912,749, filed on Oct. 9, 2019, provisional application No. 62/799,566, filed on Jan. 31, 2019.

(51) Int. Cl.
| | |
|---|---|
| *H02J 50/00* | (2016.01) |
| *H04B 5/00* | (2006.01) |
| *H02J 50/80* | (2016.01) |
| *H02J 50/12* | (2016.01) |
| *H02J 50/40* | (2016.01) |
| *H02J 7/00* | (2006.01) |

(52) U.S. Cl.
CPC .......... *H04B 5/0087* (2013.01); *H02J 7/0044* (2013.01); *H02J 50/005* (2020.01); *H02J 50/12* (2016.02); *H02J 50/402* (2020.01); *H02J 50/80* (2016.02); *H04B 5/0037* (2013.01)

(58) Field of Classification Search
None
See application file for complete search history.

(56) References Cited

U.S. PATENT DOCUMENTS

| | | | |
|---|---|---|---|
| 9,478,842 B1* | 10/2016 | Decrossas | H01P 5/087 |
| 2011/0136550 A1* | 6/2011 | Maugars | H02J 50/80 |
| | | | 455/573 |
| 2011/0217927 A1* | 9/2011 | Ben-Shalom | H02J 7/025 |
| | | | 455/41.1 |
| 2012/0126745 A1* | 5/2012 | Partovi | H02J 7/0044 |
| | | | 320/108 |

(Continued)

*Primary Examiner* — Adi Amrany

(57) ABSTRACT

Disclosed herein are a number of embodiments for wireless and non-conductive transfers of power and data to electronic devices. These technological advances can be implemented in retail security products (e.g., merchandising display positions for devices such as smart phones, tablet computers, wearables (e.g., smart watches), digital cameras, etc.) as well as docking systems for tablet computers.

20 Claims, 32 Drawing Sheets

(56) References Cited

U.S. PATENT DOCUMENTS

| | | | |
|---|---|---|---|
| 2012/0274147 A1* | 11/2012 | Stecher | H02J 50/80 307/104 |
| 2013/0266026 A1* | 10/2013 | McCormack | G06F 13/00 370/474 |
| 2014/0176055 A1* | 6/2014 | van Lammeren | H02J 50/90 320/108 |
| 2015/0145475 A1* | 5/2015 | Partovi | H02J 7/0042 320/108 |
| 2015/0280827 A1* | 10/2015 | Adiletta | H04L 49/40 398/116 |
| 2016/0056664 A1* | 2/2016 | Partovi | H02J 50/005 307/104 |
| 2016/0094051 A1* | 3/2016 | Soar | H04B 5/0081 307/9.1 |
| 2016/0149312 A1* | 5/2016 | Henry | H01Q 21/00 343/893 |
| 2017/0111805 A1* | 4/2017 | Barzegar | H04B 7/0617 |
| 2017/0170879 A1* | 6/2017 | Weaver | H01R 39/12 |
| 2017/0336503 A1* | 11/2017 | Hammerschmidt | H01P 3/12 |
| 2019/0216619 A1* | 7/2019 | McDonnall | A61B 5/296 |
| 2022/0113925 A1* | 4/2022 | Blaser | G06F 3/147 |

\* cited by examiner

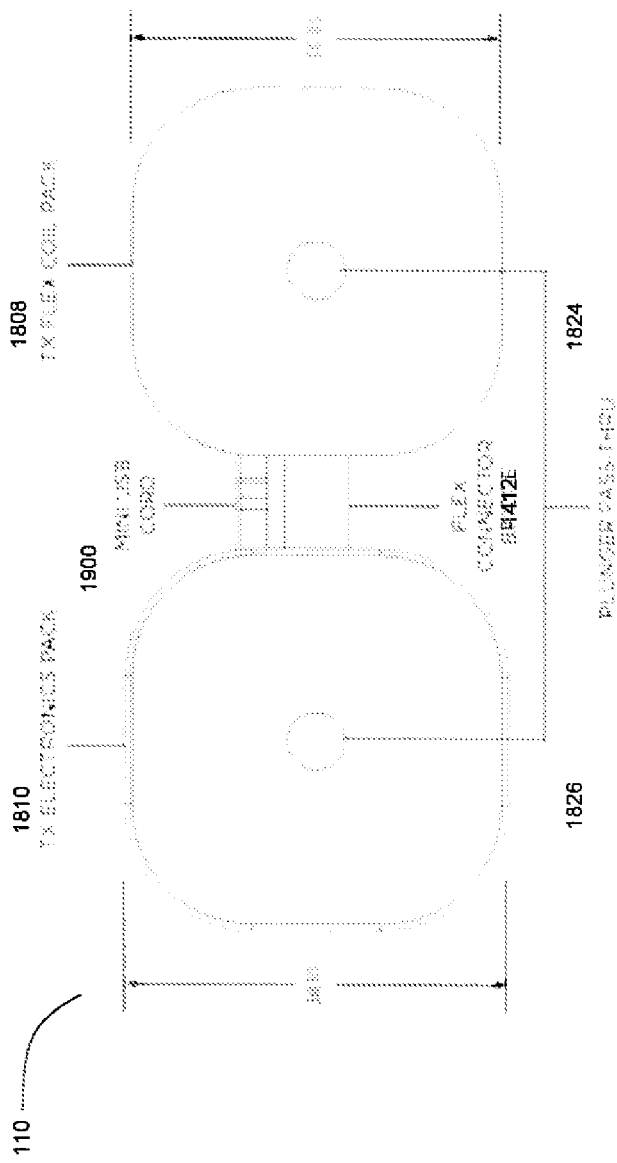
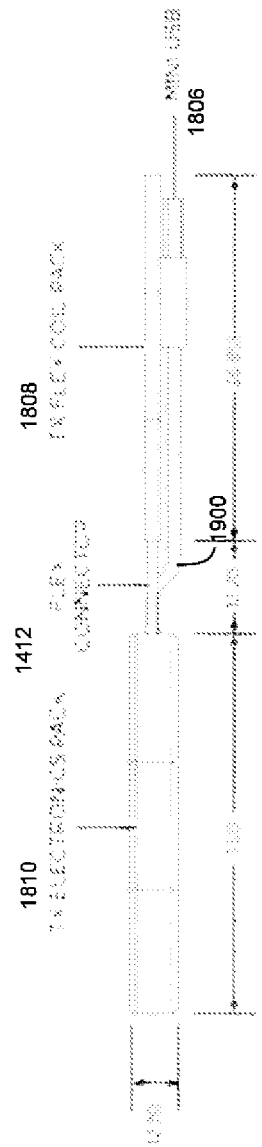
Figure 21C
Figure 21D

METHODS AND APPARATUSES FOR WIRELESS AND NON-CONDUCTIVE POWER AND DATA TRANSFERS WITH ELECTRONIC DEVICES

CROSS-REFERENCE TO RELATED PATENT APPLICATIONS

This application claims priority to PCT/US20/15914, filed Jan. 30, 2020, which claims the benefit to U.S. provisional patent application Ser. No. 62/799,566, filed Jan. 31, 2019, and this patent application also claims the benefit to U.S. provisional patent application Ser. No. 62/912,749, filed Oct. 9, 2019, the entire disclosures of which are incorporated herein by reference.

INTRODUCTION

As retail security and enclosure ecosystems expand, there is an ever-increasing desire to include data connectivity along with power/charge capabilities in such products. This data connectivity capability can be used for many different functions. Some of these include end user functions such as internet connectivity, video display connectivity, and/or USB accessory connectivity. Some functions may include administrative and infrastructural needs for software and/or firmware updates or device identification for remote monitoring and control (e.g., software unlock of a device) and/or uses cases such as mobile device management (MDM) integration on secured devices to enable wide manners of data collection and feature enablement, etc.

There are also increasing needs for retail security and enclosure products that exhibit increased longevity against the demands of harsh, commercial usage. Traditionally, retail security products for electronic devices have employed conductive connectors and cables in order to provide adequate power/charging to the secured electronic devices. However, such connectors and cables are susceptible field failures over time. Further still, the presence of cables that are connected to electronic devices (either directly or indirectly) also tend to distract greatly from the user experience of interacting with a secured electronic device in a retail setting. Also, with respect to docking systems or enclosures for devices such as a tablet computers, the cables and connectors also tend to require large cases to accommodate the physical constraints imposed with a cable/connector plugged into the tablet computer. In some cases, conductive POGO pin contacts have been used for a quick disconnect interface to replace male/female-style conductive connectors, but even such conductive contacts can still suffer from contamination, mechanical wear and tear, physical failure, etc.

In an effort to improve the art, disclosed herein are a number of embodiments for wireless and non-conductive transfers of power and data to electronic devices. These technological advances can be implemented in retail security products (e.g., merchandising display positions for devices such as smart phones, tablet computers, wearables (e.g., smart watches), digital cameras, etc.) as well as docking systems for tablet computers.

In an example embodiment, a base position assembly can include a wireless power transfer capability and a wireless data transfer capability. The wireless power transfer capability can take the form of inductive transmit coils and corresponding circuitry that define an inductive power transmitter. The wireless data transfer capability can take the form of a wireless data transceiver. The base position assembly can take the form of a pad or display surface on which an electronic device is placed or docked. The base position assembly can also take the form of a display stand such as a post position or kiosk base for the electronic device. The base position assembly can thus define a non-conductive and wireless interface for transferring power to the electronic device and bidirectionally communicating data with the electronic device. In this fashion, the base position assembly need not employ any connectors that physically and conductively connect the base position assembly with the electronic device (either directly or indirectly) or any cables that electronically connect the base position assembly with the electronic device (either directly or indirectly). For example, with a retail security product such as a product display assembly that includes a puck on which an electronic device is mounted and a base on which the puck rests, by using the above-described base position assembly as the base on which the puck rests, the need for transferring power to the puck via techniques such as charging contacts that form a conductive path for power transfer from the base to the puck can be removed and replaced with the inductive charging capability. As another example, with a docking system for a tablet computer where a case mount for the tablet computer is dockable with a base mount, the need for conductive contacts (such as POGO pins) to transfer power and data from the base mount to the case mount can be removed and replaced with the inductive charging capability and the wireless data transfer capability.

The electronic device can interface with the base position assembly in any of a number of ways. For instance, in a first example embodiment, the base position assembly can indirectly interface with the electronic device via an intermediary assembly such as a mounting puck (e.g., for retail security positions) or a case mount (e.g., for docking systems). As another instance, in a second example embodiment, the base position assembly can directly interface with the electronic device (that is, without transferring power or data to the electronic device via an intermediary assembly).

With the indirect example embodiment that employs the intermediary assembly, the interface between the base position assembly and the intermediary assembly can be completely tetherless, and at the very least need not include an electrical cable that would connect the base position assembly with the intermediary assembly. In some instances, a practitioner may want to employ a purely mechanical tether that connects the base position assembly with the intermediary assembly; but this need not be the case. Also, with such an embodiment, a practitioner may choose to employ an electronic cable connection between the intermediary device and the intermediary assembly. Such an electronic cable connection can provide a path for data communication from the electronic device to the intermediary assembly for electronic devices that may not have a native capability to wirelessly communicate with the intermediary assembly and/or base position assembly.

With the direct example embodiment, the system can employ native capabilities of the electronic device for wireless power and data transfers to support the direct wireless interface between the base position assembly and the electronic device. For example, if the electronic device includes a native inductive charging capability such as inductive receive coils and corresponding circuitry that define an inductive power receiver as well as a native wireless data transfer capability, the system need not employ the intermediary assembly in the transfer path for power and data to the electronic device. However, it should be understood that a practitioner may still choose to employ an attachment to the electronic device (such as a mounting puck, case mount, etc.) for the secure display or support of the electronic device—but such mounting puck or case mount need not play an active role in the transfer path of power and data.

Further still, to enhance performance for the system, a practitioner may choose particular combinations of wireless power transfer techniques and wireless data transfer techniques that are complementary with each other when combined together in a close proximity such as would be the case for retail security positions and docking systems. For example, the system can strategically utilize the specific combinations of wireless power and wireless data to increase the isolation and reduce any interference between the two transaction mediums. As an example, the system can combine (1) an inductive coupling-based wireless power technique that leverages inductive coupling as the transmission medium with (2) an Extremely High Frequency (EHF) (e.g., 60 GHz) near-field radiative wireless data technique. This combination not only utilizes different transmission mediums (inductive vs RF radiative), but the operating frequencies for the two are sufficiently far apart that potential interference is also greatly reduced. For example, the inductive power charging can operate in a frequency range of approximately 50 kHz to approximately 1000 kHz (e.g., Qi charging may operate in a frequency range of approximately 100 kHz to approximately 300 kHz), while EHF near field wireless data transfer may operate in a frequency range of approximately 30 GHz to approximately 300 GHz (e.g., 60 GHz). The inductive coupling typically utilizes a relatively large area for the coil, and the EHF near field communication can be implemented in a sufficiently low emission power implementation to require an almost touching operational distance and a very small (and alignment sensitive) transmissive location requirement for both ends of the data transceivers. This allows both wireless mediums to be easily physically non-interfering along with non-RF interfering. Another advantage of using EHF is that it exhibits properties that can be advantageously leveraged in example embodiments. For example, EHF signals tend to propagate very well through typical plastics (such as ABS). This allows for many different implementation advantages, such as forming plastic lenses which can direct and focus the EHF emission which can increase the distance of transmission. Plastic conduits can also be made which allows the EHF signal to travel/propagate along the plastic conduit to permit more complex transmission paths. For instance, a system could run a plastic conduit around bends (such as a 90 degree bend) and still get a good transmission.

Further still, any of the wireless power transmitter, wireless power receiver, and/or wireless data transceivers can be arranged to be adjustably positionable so that they can be adjusted in a desired manner to achieve alignment with a corresponding wireless component. For example, a wireless power transmitter can be made to be adjustably positionable relative to an intermediate assembly so that the wireless power transmitter can be easily brought into alignment with a wireless power receiver of an electronic device which may be mounted on the intermediary assembly.

These and other features and advantages of the present invention will be described hereinafter to those having ordinary skill in the art.

BRIEF DESCRIPTION OF THE DRAWINGS

FIGS. 21A-D depict perspective, side, top, and front views, respectively, of an example embodiment for an adjustably positionable wireless power transmitter.

DETAILED DESCRIPTION OF EXAMPLE EMBODIMENTS

Figure 1:
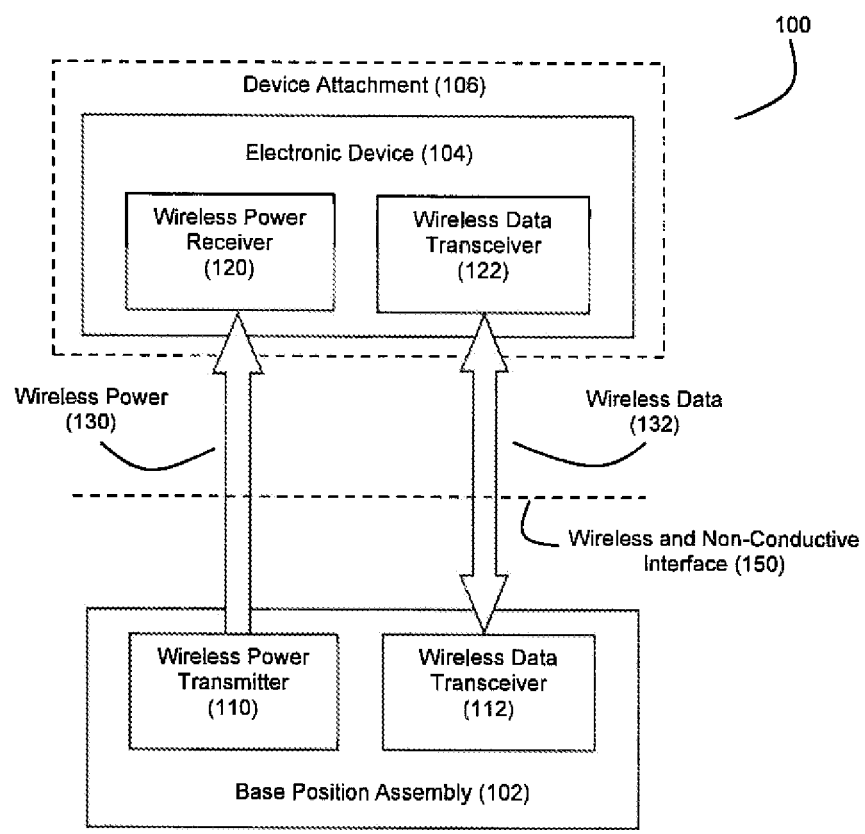
FIG. 1 depicts an example system where a wireless and non-conductive interface is employed for directly transferring power and data with respect to a base position assembly and electronic device.

FIG. 1 depicts an example system 100 where a wireless and non-conductive interface 150 is employed for directly transferring power and data with respect to a base position assembly 102 and an electronic device 104. The electronic device 104 can take any of a number of forms, such as a smart phone, tablet computer, wearable device (e.g., smart watch, virtual reality (VR) goggles, etc.), digital camera, etc.

The base position assembly 102 can include a wireless power receiver 110 and a wireless data transceiver 112. The base position assembly 102 can take any of a number of forms depending on the use case. For example, for a sleek retail presentation of the electronic device 104 to customers, the base position assembly 102 may take the form of a display pad with a low profile that is attached or otherwise laying or secured to a display table. For any circuitry or other features of the base position assembly 102 that may not be sufficiently low profile for a sleek table appearance, a recess can be provided in the table for accommodating a thickness of the pad. As another example, the base position assembly 102 can take the form of a riser or display stand that can be attached or secured to a display table. As yet another example, the base position assembly can take the form of a base mount for a docking system. Still other forms for the base position assembly 102 may be employed if desired by a practitioner. Examples of suitable forms for a base position assembly 102 in retail merchandising and docking system contexts are described in U.S. Pat. Nos. 8,558,688, 8,698,617, 8,698,618, 9,760,116, 9,786,140, 10,026,281, and 10,101,770 and U.S. Pat. App. Pub. Nos. 2018/0049563, 2018/0143664, and 2018/0143665, the entire disclosures of which are incorporated herein by reference.

Furthermore, base position assembly 102 can include a connection to a power source and corresponding circuitry for receiving power from the power source. As described below, this power can be transferred to the electronic device 104 via the wireless power transmitter 110. Also, base position assembly 102 may include a wireless node that can be a member of a wireless network such as a wireless mesh network with other base position assemblies 102 and that allows for wireless data communication with a remote computer system, as described in U.S. Pat. App. Pub. Nos. 2017/0164314, 2018/0007648, 2018/0288720, 2018/0288721, and 2018/0288722, the entire disclosures of which are incorporated herein by reference. As described below, such a wireless connectivity with a remote computer system can allow the electronic device to communicate data to the remote computer system via (1) the wireless data transfer capability between the electronic device 104 and base position assembly 102 and (2) the wireless connectivity between the wireless node of the base position assembly 102 and the remote computer system. Similarly, such a wireless connectivity with a remote computer system can allow the remote computer system to communicate data to the electronic device 104 via a reverse path.

The wireless power transmitter 110 can take the form of one or more inductive transmit coils and corresponding circuitry for driving the one or more inductive transmit coils to generate wireless power 130. The wireless power transmitter 110 can be driven with power received from a power signal delivered to the base position assembly 102 from an external power source. Also, the wireless power transmitter 110 can employ any of a number of inductive charging techniques. For example, the inductive power transmitter can employ resonant inductive coupling. An example of a technique for resonant inductive coupling that can be employed is Qi inductive power transfer circuitry. As another example, the inductive power transmitter can employ PMA inductive power transfer circuitry. However, it should be understood that other techniques for wireless power transfer could be employed by the wireless power transmitter 110.

The wireless data transceiver 112 can take the form of one or more wireless transceivers and corresponding circuitry for bidirectional communication of wireless data 132. In an example embodiment, the wireless data transceiver 112 can provide short-range (such as near field) wireless connectivity rather than longer range wireless connectivity so as to reduce the potential for interference problems. As an example, the short range for wireless connectivity can be on the order of millimeters. However, longer range distances can be achieved by using lenses and/or conduits that propagate the wireless data 132 to targeted locations. For example, as noted above plastic lenses and/or plastic conduits can be used to propagate EHF wireless data 132 in this fashion.

Examples of wireless data transfer techniques that can be implemented by the wireless data transceiver 112 include Qi data transfer, near field communication (NFC) data transfer, RFID data transfer, infrared (IR) data transfer, optical data transfer, and/or near field high frequency data transfer (e.g., such as via an EHF carrier that can transport data wirelessly point-to-point over short distances through air and plastic, an example of which can be provided by a Keyssa integrated circuit (IC) chip), etc.

Examples of transport techniques that can be employed for the wireless data 132 may include USB transport, video transport, GPIO transport, and/or custom transport, etc. In other example embodiments, longer range wireless data transfer techniques may be employed for wireless data 132, such as WiFi, Bluetooth, ANT, Zigbee, etc. However, it is believed that the short range/near field techniques will be advantageous as they are expected to be less susceptible to typical noise interference and other environmental variables that can lead to unreliable performance.

It is believed that the use of emerging near field high data rate wireless data transfer solutions such as NFC and near field high frequency approaches may be capable of operating at 5+ gigabits per second (with potential upward ceilings of 25-30 gigabits per second per interface) in the context of system 100. Due to the high-frequency nature of these protocols and properties of certain materials with EHF electromagnetic energy (within a range between 30-300 GHz, for example 60+ GHz electromagnetic energy), there are many options which can be used to keep wireless transmissions isolated from each other as well as localized. This allows for the potential to stack multiple, independent, wireless interfaces close to each other in order to increase function and overall data rate. When used as a general radiator, the high frequency wireless data transceiver 112 can operate effectively over distances on the order of millimeters, although as noted longer distances can be achieved for high frequency emissions using lenses and conduits.

The wireless power transmitter 110 and wireless data transceiver 112 can be positioned within the base position assembly near a surface of the base position assembly 102 on which the electronic device 104 will rest so that they can properly interact with their counterpart wireless power receiver 120 and wireless data transceiver 122 when electronic device 104 is brought into proximity with the surface. The positioning relative to the base position assembly surface can vary based on the capabilities of the techniques selected for wireless power and data transmission in particular implementations. In an example embodiment, the surface of the base position assembly 102 on which the electronic device 104 rests be made of a thin material that is transmissive with respect to the signals for the wireless power 130 and wireless data 132 so that the wireless power 130 and wireless data 132 are operably transferred over the interface 150 when the electronic device 104 is in sufficient proximity to the base position assembly 102. In another example embodiment, some classes of wireless signals (such as higher frequency signals (e.g., around 60 GHz) exhibit excellent propagation characteristics through plastics. Accordingly, if the wireless signals being passed over interface 150 have a sufficiently high frequency, plastic surfaces or components of the base position assembly may be shaped or contoured to act as a lens or a conduit for the propagation of the wireless signals. This may permit greater spacing of the wireless data transceivers 112 and 122 relative to each other. As another example, the base position assembly 102 can include gaps, holes, and/or recesses in concert with a geometric shape that allows a clear over-the-air path for the wireless power and data signals.

The electronic device 104 shown by FIG. 1 includes a wireless power receiver 120 and a wireless data transceiver 122. In addition to these components, the electronic device 104 will include additional circuitry and features that are particular to the type of electronic device 104 being used, whether it be a smart phone, tablet computer, digital camera, etc. The wireless power receiver 120 and wireless data transceiver 122 can be native components of the electronic device 104, and would typically be located near an external surface of the electronic device (e.g., for a smart phone, near a back surface of the smart phone) for ease of connectivity over the interface 150. The wireless power receiver 120 can include an inductive receive coil and corresponding circuitry that are complementary and inter-operable with the wireless power transmitter 110 employed in the base position assembly 102. Likewise, the wireless data transceiver 122 can be complementary and inter-operable with the wireless data transceiver 112 employed in the base position assembly 102.

In an example embodiment, the wireless data transceiver 122 can support a communication protocol that allows the electronic device 104 to wirelessly communicate identifying information about the electronic device 104 and/or status information about the electronic device 104. Typically, a wired USB connection is employed for this purpose, but with an example embodiment, gaining wireless access to such information about the electronic device 104 via the wireless data transceiver 122 greatly expands the remote monitoring and control capabilities that can be exerted on system 100 via connectivity with a remote computer system as described in the above-referenced and incorporated U.S. Pat. App. Pub. Nos. 2017/0164314, 2018/0007648, 2018/0288720, 2018/0288721, and 2018/0288722. The wireless connection via wireless data transceiver 122 and wireless data transceiver 112 can be a wireless USB connection that allows for the transfer of identifying information about the electronic device 104 and/or status information about the electronic device 104. For wireless connections that are non-USB, different descriptors may be employed to communicate such information.

System 100 may also optionally include a device attachment 106 for the electronic device 104. The device attachment 106 can take any of a number of forms, but it need not play any active role in the wireless interface 150 (beyond not impeding the operability of the wireless interface 150). An example of a device attachment 106 for electronic device 104 can be a mounting puck or security sensor (such as flexible adhesive sensor that attaches to the electronic device 104) that can support the electronic device 104 and/or provide security features (such as alarms) in the event of unauthorized removal of the electronic device 104 from the mounting puck or security sensor. Another example of a device attachment 106 can be a case mount as can be used in a docking system for tablet computers. Such a case mount can provide a secure enclosure for a tablet computer and permit docking with a base mount of the docking system. The device attachment 106 can be designed with suitable materials and form factor so as to not impede the operability of the wireless interface 150. For example, the device attachment 106 can be made of a thin material that is transmissive with respect to the signals for the wireless power 130 and wireless data 132 so that the wireless power 130 and wireless data 132 are operably transferred over the interface when the electronic device 104 is in sufficient proximity to the base position assembly 102. As another example, for classes of wireless signals as discussed above (such as higher frequency signals (e.g., around 60 GHz) which exhibit excellent propagation characteristics through plastics, the plastic surfaces or components of the device attachment may be shaped or contoured to act as a lens or a conduit for the propagation of the wireless signals. As another example, the device attachment can include gaps, holes, and/or recesses in concert with a geometric shape that allows a clear over-the-air path for the wireless power and data signals.

Security in the example of FIG. 1 can be provided in any of a number of ways. For example, a mechanical tether (e.g., steel retractor cable) could be used to physically link the base position assembly 102 with device attachment 106. However, in a tetherless system 100, wireless signals can be used to provide spatial geo-fencing and/or proximity detection that can trigger alarms or other actions when device 104 is detected as moving too far from the base position assembly 102 or other reference point. Accordingly, wireless transceivers could be included in the base position assembly 102 as well as the electronic device 104 and/or device attachment 106 to define the wireless geo-fence and/or proximity detection capabilities. A battery can be included in the device attachment 106 for powering the circuitry used for the device attachment 106's operations with respect to the wireless geo-fence and/or proximity detection.

Figure 2:
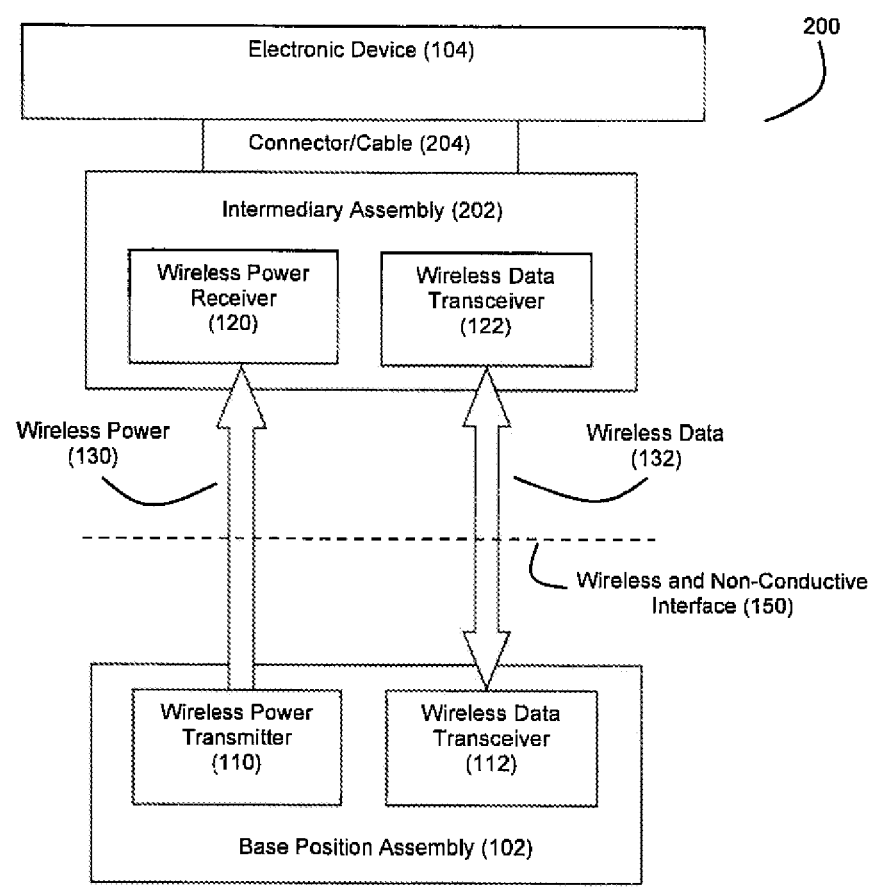
FIG. 2 depicts an example system where a wireless and non-conductive interface is employed for indirectly transferring power and data with respect to a base position assembly and electronic device via an intermediary assembly.

FIG. 2 depicts an example system 200 where a wireless and non-conductive interface 150 is employed for indirectly transferring power and data with respect to a base position assembly 102 and electronic device 104 via an intermediary assembly 202. In this example, the wireless power receiver 120 and wireless data transceiver 122 are housed within the intermediary assembly 202. A connector and/or cable 204 is then used to transfer power to the electronic device 104 and communicate data between the electronic device 104 and the intermediary assembly 202. An embodiment such as system 200 may be useful in instances where the electronic device does not have native capabilities for receiving wireless power and/or wirelessly sharing information about itself.

For example, many smart phones are capable of communicating identifying information and status information about itself via a wired USB connection, and this type of connection (via 204) may be employed to facilitate desired data transfers for system 200.

The intermediary assembly 202 can take any of a number of forms similar to those described above for device attachment 106. For example, the intermediary assembly 202 can be a mounting puck or security sensor (such as flexible adhesive sensor that attaches to the electronic device 104) that can support the electronic device 104 and/or provide security features (such as alarms) in the event of unauthorized removal of the electronic device 104 from the mounting puck or security sensor. Another example of an intermediary assembly 202 can be a case mount as can be used in a docking system for tablet computers. Such a case mount can provide a secure enclosure for a tablet computer and permit docking with a base mount of the docking system. Furthermore, the intermediary assembly 202 may include a wireless node that can be a member of a wireless network such as a wireless mesh network with other devices and that allows for wireless data communication with a remote computer system, as described in the above-referenced and incorporated U.S. Pat. App. Pub. Nos. 2017/0164314, 2018/0007648, 2018/0288720, 2018/0288721, and 2018/0288722.

Accordingly, it should be understood that systems 100 and 200 as shown by FIGS. 1 and 2 provide techniques for powering and communicating with electronic devices in settings such as retail security displays and docking systems while avoiding the need to connect the electronic device 104 with the base position assembly via an electronic cable or physical connector. By avoiding the need for such wired electrical connectivity, the systems 100 and 200 are expected to exhibit greater longevity in the field by avoiding the wear and tear that such conventional physical electronic connections are subjected to over time. Also, by avoiding the need for such wired electrical connectivity, the systems 100 and 200 can exhibit a sleeker and lighter-weight appearance that avoids the rigidity imposed on the system by cables and physical connections. Thus, systems 100 and 200 can be implemented to be completely tetherless as between the base position assembly 102 and electronic device 104. However, it should be understood that some practitioners may nevertheless choose to mechanically tether the electronic device 104 to the base position assembly 102 via a non-electrical mechanical cable that connects the base position assembly 102 to the device attachment 106 or intermediary assembly 202 to which the electronic device is attached.

Furthermore, as referenced above with respect to FIG. 1, in an example embodiment of systems 100 and 200 that are tetherless as between the base position assembly 102 and electronic device 104, the intermediary assembly 202, electronic device 104, or device attachment 106 may include a wireless fencing capability via wireless devices such as a wireless transceivers so that the base position assembly 102 can detect if the electronic device 104 moves beyond a defined distance (as defined by detected signal strength, measured distance, or other factors) from the base position assembly 102.

A wide range of data can be communicated as wireless data 132 over wireless interface 150. For example, the wireless data 132 can include identifying information about the electronic device 104 (e.g., a make and model for the electronic device, a serial number for the electronic device, a SKU for the electronic device). As another example, the wireless data 132 may include status information about the electronic device 104 (e.g., a charge status for a battery in the electronic device 104, or other operational information for the electronic device 104). As yet another example, the wireless data 132 may include data indicative of user interaction with the electronic device 104 (e.g., data indicative of the existence and/or duration of a lift event for the electronic device 104, data input into the electronic device 104 by a user, etc.). As yet another example, the wireless data 132 can include a command for delivery to the electronic device 104 and/or intermediary assembly 202 (e.g., an arming and/or disarming command for security features, a locking and/or unlocking command for access features, etc.). As yet another example, the wireless data 132 can include software and/or firmware for updating software and/or firmware on the electronic device 104 and/or intermediary assembly 202. As noted above, the base position assembly 102 can include a wireless node that is a member of a wireless network for linking the system 100/200 with a remote computer system from which the system 100/200 can be remotely monitored and/or controlled as described in the above-referenced and incorporated U.S. Pat. App. Pub. Nos. 2017/0164314, 2018/0007648, 2018/0288720, 2018/0288721, and 2018/0288722.

Figure 3A:
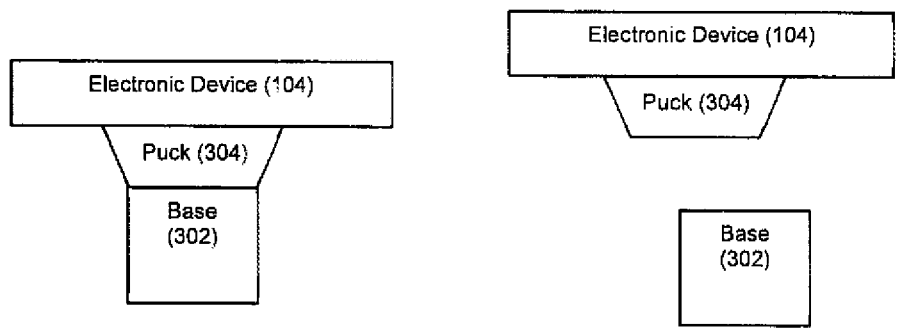
FIGS. 3A-3D depict examples of retail security position that can be employed to implement the embodiments of FIGS. 1 and/or 2.

FIG. 3A shows an example retail security position that can be employed to implement system 100 of FIG. 1. The retail security position can take the form of a base 302 and puck 304 similar to those as described in the above-referenced and incorporated U.S. Pat. Nos. 8,558,688, 8,698,617, 8,698,618, 9,786,140, and 10,026,281, and U.S. Pat. App. Pub. No. 2018/0049563. However, due to the wireless power transfer capabilities of system 100, the charging contacts described in the above-referenced and incorporated patents and published patent applications can be omitted as well as a power cable connection between the puck 304 and electronic device 104. With reference to FIG. 1, the base 302 can play the role of base position assembly 102 and the puck 304 can play the role of device attachment 106.

Figure 3B:
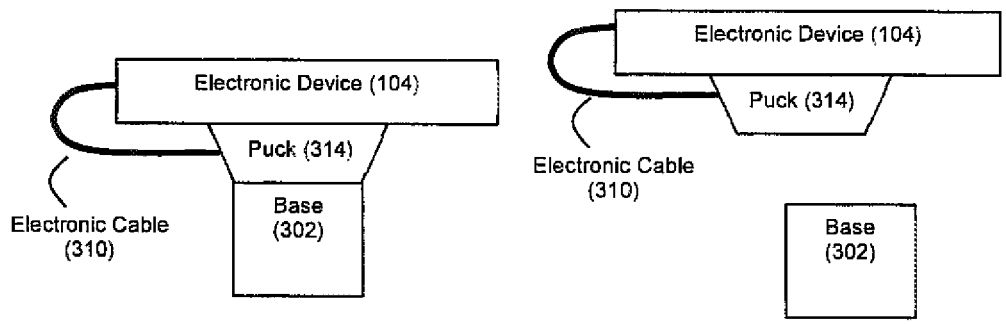

With the example of FIG. 3A, the electronic device 104 and attached puck 304 can be rested on base 302. While in such a rest position, the system can support the wireless transfer of wireless power 130 as discussed above as well as the wireless transfer of wireless data 132 as discussed above. When the electronic device 104 and attached puck 304 are lifted from the base 302 (see the right side of FIG. 3A), the wireless power link can be broken. The wireless data link may also be broken if the device 104 is moved out of the range of the respective wireless data transceivers 112 and 122 in the base 302 and device 104 FIG. 3B shows an example retail security position that can be employed to implement system 200 of FIG. 2. The retail security position can take the form of a base 302 and puck 304 similar to those as described in the above-referenced and incorporated U.S. Pat. Nos. 8,558,688, 8,698,617, 8,698,618, 9,786,140, and 10,026,281, and U.S. Pat. App. Pub. No. 2018/0049563. However, due to the wireless power transfer capabilities of system 200, the charging contacts described in the above-referenced and incorporated patents and published patent applications can be omitted. With reference to FIG. 2, the base 302 can play the role of base position assembly 102, the puck 304 can play the role of intermediary assembly 202, and the electronic cable 310 can play the role of connector/cable 204.

With the example of FIG. 3B, the puck and base are similar to those described above for FIG. 3A, but there is an electronic cable 310 that attaches the puck 314 to electronic device 104. Accordingly, in this example, there can be a wired power and/or data connection between the puck 314 and electronic device 104. With FIG. 3B, like FIG. 3A, the electronic device 104 and attached puck 314 can be rested on base 302. While in such a rest position, the system can support the wireless transfer of wireless power 130 as discussed above as well as the wireless transfer of wireless data 132 as discussed above. When the electronic device 104 and attached puck 314 are lifted from the base 302 (see the right side of FIG. 3B), the wireless power link can be broken. The wireless data link may also be broken if the device 104 is moved out of the range of the respective wireless data transceivers 112 and 122 in the base 302 and puck 314.

Figure 3C:
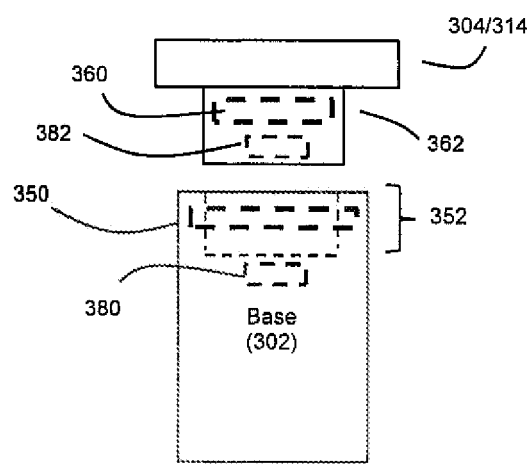
Figure 3D:
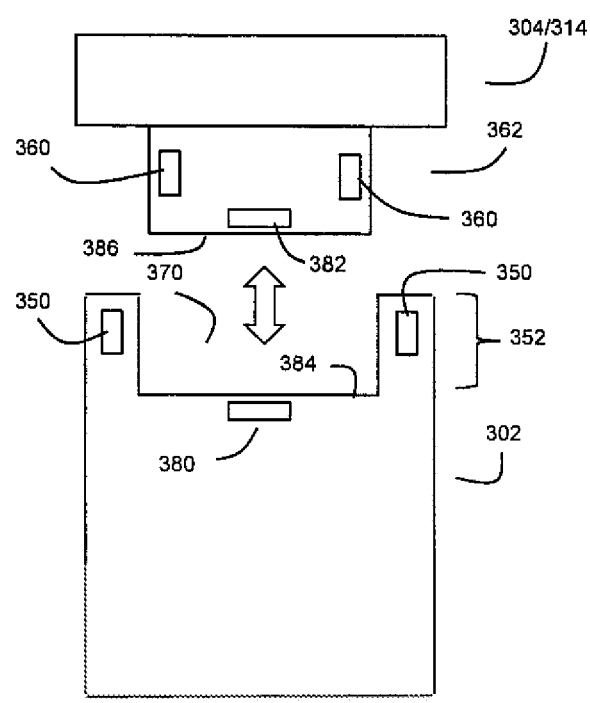

FIGS. 3C and 3D show an example where one or more inductive transmit coils 350 can be positioned in the base 302 and where one or more inductive receive coils 360 can be positioned in the puck 304/314 to support wireless power transmission from the base 302 to puck 304/314. FIG. 3C shows a side view of a base 302 which has an inductive transmit coil 350 that is located concentrically inside a periphery of a rim 352 on base 302. Rim 352 defines a recess 370 (see FIG. 3D) in which a lower portion 362 of puck 304/314 fits when the puck 304/314 is rested on the base 302. An inductive receive coil 360 can be positioned in the puck 304's/314's lower portion 362 so that coil 360 is near the periphery of lower portion 362 and will be concentrically within and adjacent coil 350 when the puck 304/314 is resting on the base 302. FIG. 3D shows a central cross-sectional view of the base 302 and puck 304/314, where this cross-sectional view clearly shows the recess 370 formed by rim 352.

Furthermore, for wireless data transmission, FIGS. 3C and 3D show an example where the base 302 includes a wireless data transceiver 380 positioned near a lower surface 384 of recess 370, and where the puck 304/314 includes a wireless data transceiver 382 positioned near the bottom surface 386 of lower portion 362. The transceivers 380 and 382 can thus be positioned respectively in the base 302 and puck 304/314 so that they are sufficiently proximate for wireless data transmission between the base 302 and puck 304/314 when the puck 304/314 is resting on the base 302.

Also, it should be understood that the bases 302 and/or pucks 304 of FIGS. 3A-3D may include wireless nodes that are members of a wireless network so that the retail security position has connectivity with a wirelessly connected environment for remote monitoring and control by a remote computer system as discussed in the above-referenced and incorporated U.S. Pat. App. Pub. Nos. 2017/0164314, 2018/0007648, 2018/0288720, 2018/0288721, and 2018/0288722.

Figure 4:
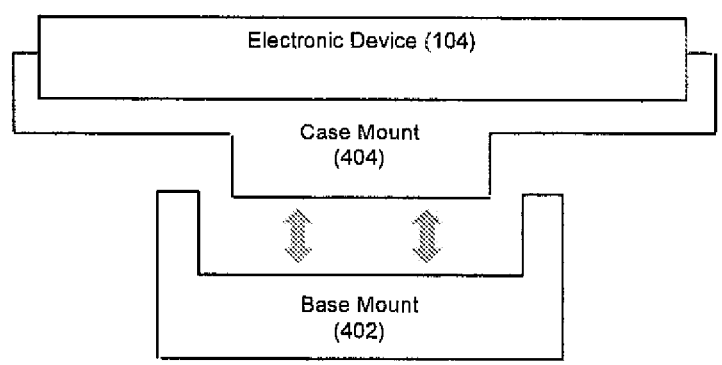
FIG. 4 depicts an example docking system that can be employed to implement the embodiments of FIGS. 1 and/or 2.

FIG. 4 depicts an example docking system that can be employed to implement the embodiments of FIGS. 1 and/or 2. The docking system can take the form of a base mount 402 and case mount 404 similar to those as described in the above-referenced and incorporated U.S. Pat. Nos. 9,760,116 and 10,101,770 and U.S. Pat. App. Pub. Nos. 2018/0143664 and 2018/0143665. However, due to the wireless power transfer capabilities of systems 100/200, the contact arrangements as between the base mounts and case mounts described in the above-referenced patents and published patent applications can be omitted. With reference to FIGS. 1 and 2, the base mount 402 can play the role of base position assembly 102, and the case mount 404 can play the role of device attachment 106 and/or intermediary assembly 202.

With the example of FIG. 4, the electronic device 104 and attached case mount 404 can be docked with base mount 404. While in such a docking position, the system can support the wireless transfer of wireless power 130 as discussed above as well as the wireless transfer of wireless data 132 as discussed above. When the electronic device 104 and attached case mount 404 are undocked from the base mount 402, the wireless power link can be broken. The wireless data link may also be broken if the device 104 is moved out of the range of the respective wireless data transceivers 112 and 122 in the base mount 402 and case mount 404 or device 104. As an example, the base mount 402 may include the wireless power transmitter 110 and the wireless data transceiver 112 at locations near a surface of the recess in which the case mount 404 is received. Moreover, as an example, the case mount 404 may include the wireless power receiver 120 and the wireless data transceiver 122 at locations near a surface of the case mount 404 so that they will be sufficiently proximate to the wireless power transmitter 110 and the wireless data transceiver 112 when the case mount 404 is docked with the base mount 402 for wireless power and data transfer to occur.

Also, it should be understood that the base mount 402 and case mount 404 of FIG. 4 may include wireless nodes that are members of a wireless network so that the docking system has connectivity with a wirelessly connected environment for remote monitoring and control by a remote computer system as discussed in the above-referenced and incorporated U.S. Pat. App. Pub. Nos. 2017/0164314, 2018/0007648, 2018/0288720, 2018/0288721, and 2018/0288722.

Figure 5:
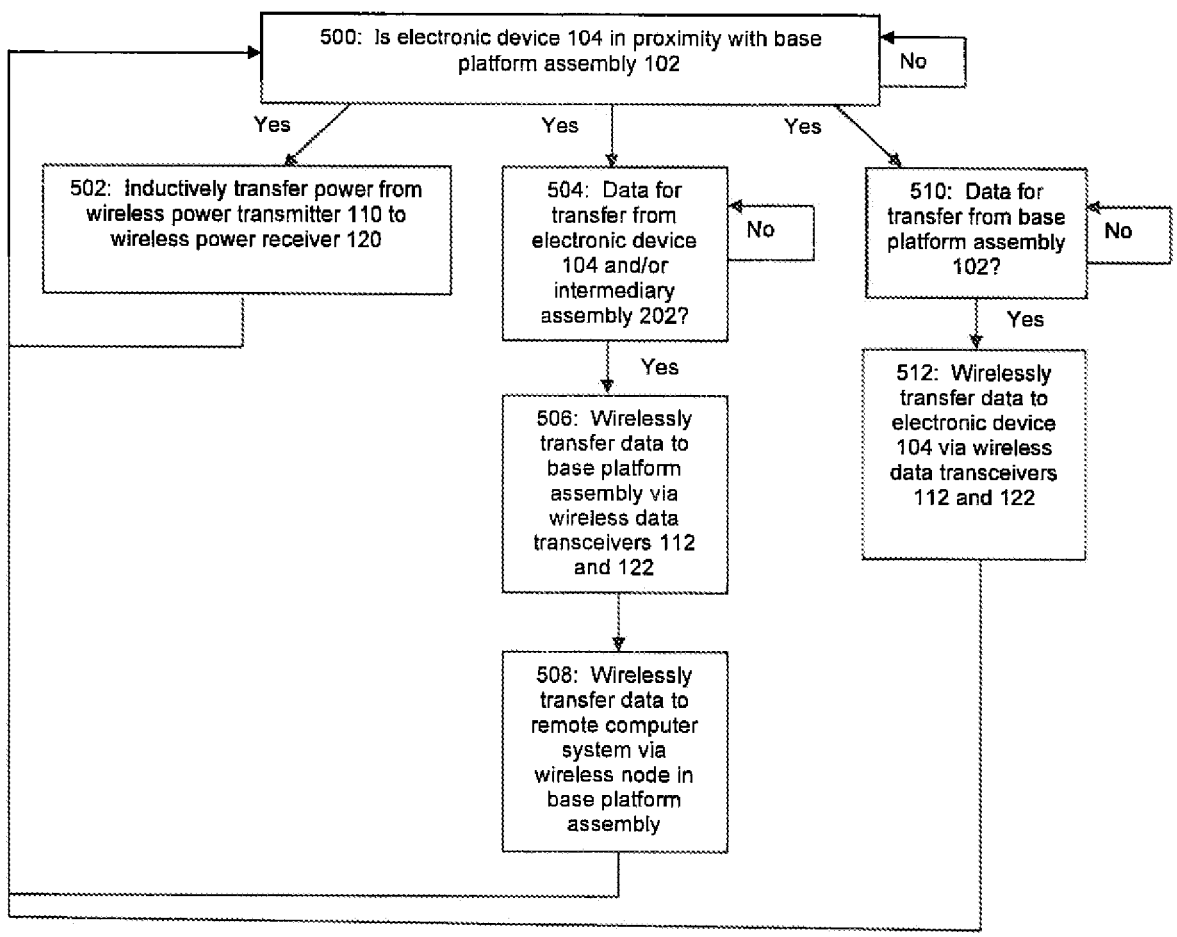
FIG. 5 depicts an example process flow for the operations of the embodiments of FIGS. 1 and/or 2.

FIG. 5 depicts an example process flow for the operations of the embodiments of FIGS. 1 and/or 2. As step 500, when the electronic device 104 is brought into proximity with the base position assembly 102, the wireless power and data transfer is enabled.

At step 502, wireless power is transferred from the wireless power transmitter 110 in the base position assembly 102 to the nearby wireless power receiver 120 in the electronic device 104 (see FIG. 1) or intermediary assembly 202 (see FIG. 2). If desired, a practitioner can employ intelligence in the wireless power transmitter 110 (and/or wireless power receiver 120) to control when the charging turns on and off (and the amount of power transferred via the wireless power signal. Examples of techniques that can be used for implementing such intelligence are described in U.S. Patent Application Publication 2019/0288537, the entire disclosure of which is incorporated herein by reference. For example, when making decisions about thresholds to be used for adjusting the wireless power for charging, the technology disclosed in the above-referenced and incorporated 2019/0288537 publication can adjust such thresholds to account for efficiency losses in the inductive power transfer (relative to a conductive power transfer).

If step 504 results in a determination that there is data to be transferred from the electronic device 104 and/or intermediary assembly 202 over wireless interface 150, the process flow proceeds to step 506. At step 506, wireless data 132 is wirelessly transferred from the wireless data transceiver 122 in the electronic device 104 or intermediary assembly 202 as applicable to the wireless data transceiver 112 in the base position assembly 202. Thereafter, the base position assembly 202 can wirelessly relay such data to a remote computer system via a wireless network as described in the above-referenced and incorporated U.S. Pat. App. Pub. Nos. 2017/0164314, 2018/0007648, 2018/0288720, 2018/0288721, and 2018/0288722 (step 508).

If step 510 results in a determination that there is data to be transferred from the base position assembly 102 over wireless interface 150, the process flow proceeds to step 512. The data can be data that the base position assembly 202 may receive from a remote computer system (such as a remote command, a software/firmware update, etc.) via a wireless network as described in the above-referenced and incorporated U.S. Pat. App. Pub. Nos. 2017/0164314, 2018/0007648, 2018/0288720, 2018/0288721, and 2018/0288722. At step 512, wireless data 132 is wirelessly transferred from the wireless data transceiver 112 in the base position assembly 202 to the wireless data transceiver 122 in the electronic device 104 or intermediary assembly 202 as applicable.

As noted above, it is believed that specific combinations of wireless power and data transmission techniques can be employed advantageously with each other.

Figure 6A:
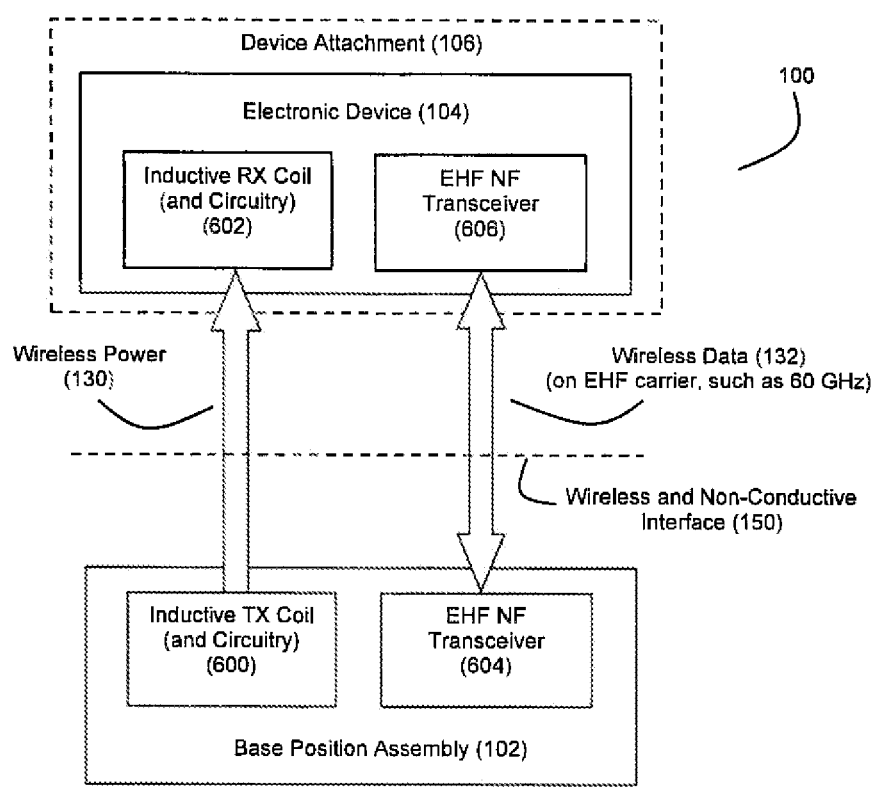
FIGS. 6A and 6B depict example systems that combine inductive coupling for wireless power transmission with EHF near field communication for wireless data transmission.
Figure 6B:
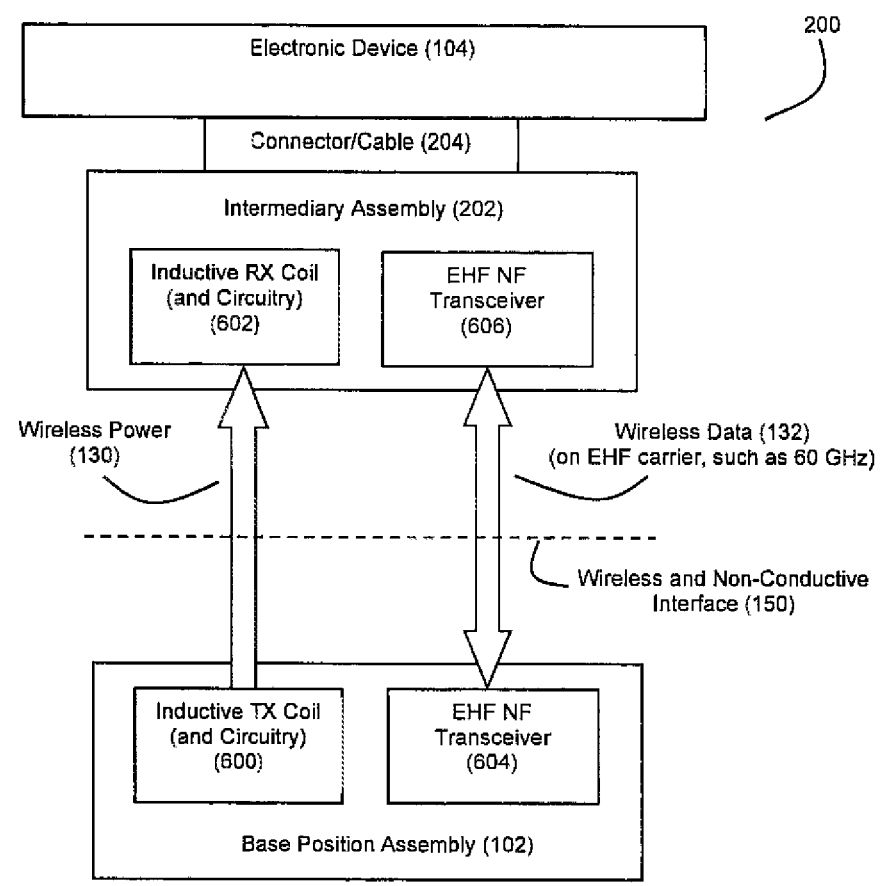

For example, FIGS. 6A and 6B show example systems 100 and 200 respectively, where the wireless power transfer employs inductive RF coils 600 and 602 as wireless power transmitter 110 and wireless power receiver 120 respectively and where the wireless data transfer employs EHF near field wireless data transceivers 604 and 606 as wireless data transceivers 112 and 122 respectively. The size for the inductive charging coils can vary as desired by a practitioner. As examples, the coil size may exhibit a diameter in the range of approximately 1.5 to 3 inches. The inductive RF coils can operate at frequencies such as those in a range between 50 kHz to 1000 kHz (for example, Qi inductive charging can operate at around 100 kHz), and the EHF near field wireless data transceivers can operate at a frequency such as 30 GHz or more (e.g., 60 GHz). By utilizing different transmission mediums (inductive vs RF radiative), and operating frequencies that are sufficiently far apart, the potential for interference between the wireless power 130 and wireless data 132 is greatly reduced.

Any of a number of techniques can be used to achieve alignment between the wireless power components 110/120 and wireless data components 112/122 for systems 100/200 when the electronic device 104 is resting on the base position assembly 102.

Figure 7A:
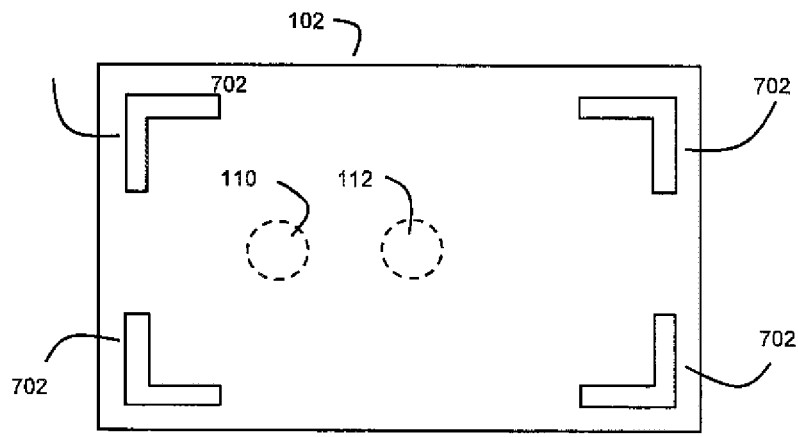
FIG. 7A-C depict examples of techniques that can be used for aligning the wireless power and data components of the system.
Figure 7B:
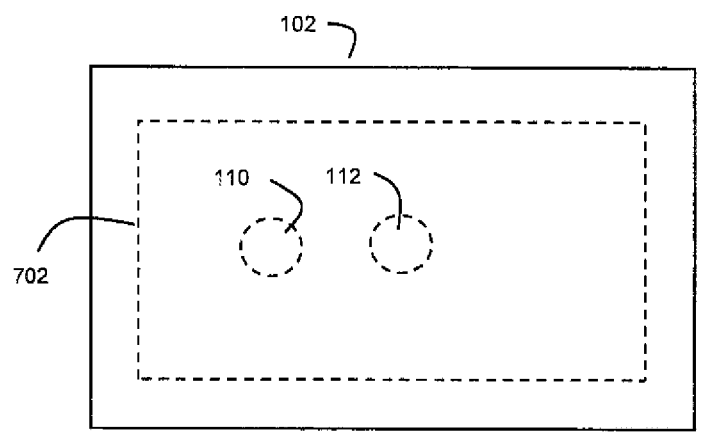

For example, in an example embodiment, visual indicators can be placed on the base position assembly 102 to identify how the electronic device 104 (or intermediary assembly 202) should be positioned thereon to achieve alignment between the wireless power components 110/120 and wireless data components 112/122 when the electronic device 104 is resting on the base position assembly 102. For example, as shown by FIGS. 7A and 7B, an outline for device 104 can be visually indicated on a surface of the base position assembly 102 to show where the device 104 should be placed in that base position assembly surface to achieve alignment of the wireless power components 110/120 and wireless data components 112/122. FIGS. 7A and 7B show a top view of an example base position assembly 102 where visual indicators 702 show how an electronic device 104 (or intermediary assembly 202) can be positioned on the base position assembly 102 to achieve an alignment between the wireless power and data components. The locations of the wireless power transmitter 110 and wireless data transceiver 112 on the base position assembly 102 are shown, and such an example can leverage a known spatial relationship between the boundaries of the electronic device 104 (or intermediary assembly 202) and the locations of the wireless power receiver 112 and wireless data transceiver 122 within the electronic device 104 (or intermediary assembly 202) to achieve alignment when positioned in accordance with the visual indicators 702. The visual indicators 702 in the example of FIG. 7A are the dimensional corners of the electronic device 102 (or intermediary assembly 202). The visual indicator 702 in the example of FIG. 7B is the overall outline of the electronic device 102 (or intermediary assembly 202).

As another example embodiment, the base position assembly 102 can be designed to include a sufficiently large number of wireless power transmitters 110 (e.g., multiple inductive coils) so that the likelihood of one of the coils aligning with the complementary coil(s) in the device 104 or intermediary assembly 202 when the device 104 or intermediary assembly 202 is placed on the base position assembly 102 increases. Similarly, the base position assembly 102 can be designed to include a sufficiently large number of wireless data transmitters 112 so that the likelihood of one aligning with a complementary wireless data transceiver 122 in the device 104 or intermediary assembly 202 when the device 104 or intermediary assembly 202 is placed on the base position assembly 102 increases Similarly, multiple wireless power receivers 112 and/or wireless data transceivers 122 can be included in the device 104 or intermediary assembly 202 to increase the chances of alignment.

As another example embodiment, the base position assembly 102 can include physical features on its surface to force a physical alignment with the device 104 and/or intermediary assembly 202. For example, a recess can be included on a surface of the base position assembly 102 where the wireless power components 110/120 and wireless data components 112/122 are located. This recess can be sized to fit the device 104 (which may include device attachment 106) and/or intermediary assembly 202 (and device 104) so that when the device 104 is placed in the recess an alignment between the wireless power components 110/120 and wireless data components 112/122 is achieved. For example, with reference to FIGS. 7A and 7B, the visual indicators 702 could be replaced with a recess that is sized to fit the outline of the electronic device 104 (or intermediary assembly 202). As another example, the base position assembly 102 can include raised portions that are designed to force or encourage an alignment between the wireless power components 110/120 and wireless data components 112/122 when the device 104 (which may include device attachment 106) and/or intermediary assembly 202 (and device 104) is placed on the base position assembly 102. For example, one or more corner pieces could raise from the surface of the base position assembly 102 to force or encourage a specific placement of the device 104 or intermediary assembly 202 relative to the base position assembly's wireless power transmitter 110 and wireless data transceiver 120. For example, with reference to FIGS. 7A and 7B, the visual indicators 702 could be replaced with corresponding raised elements.

Figure 7C:
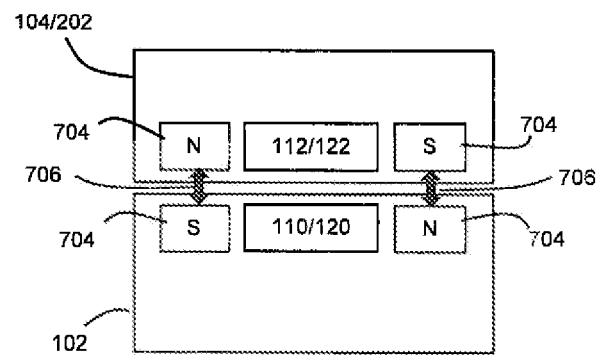

As yet another example embodiment, magnets can be included in the base position assembly 102 that can interact with metallic elements or complementary magnets in the device 104 or intermediary assembly 202 to create attractive forces that drive an alignment between the wireless power components 110/120 and wireless data components 112/122 when the device 104 (which may include device attachment 106) and/or intermediary assembly 202 (and device 104) is placed on the base position assembly 102. FIG. 7C shows an example where complementary magnets 704 are located in the base position assembly 102 and electronic device 104 (or intermediary assembly 202) that force an alignment between the wireless power and/or data components 110/120 in the base position assembly 102 and the wireless power and/or data components 112/122 in the electronic device 104 (or intermediary assembly 202) via magnetic attraction 706.

Furthermore, to increase the permitted distance between the EHF near field wireless data transceivers 604 and 606 for communicating with each other, lens and/or conduits that are conducive to RF signal propagation (e.g., plastic lenses and/or plastic conduits) can be employed to leverage the propagation characteristics of the EHF carrier signals and expand distance or other positioning options as between the base position assembly 102 and/or electronic device 104 (or intermediary assembly 202).

Figure 8A:
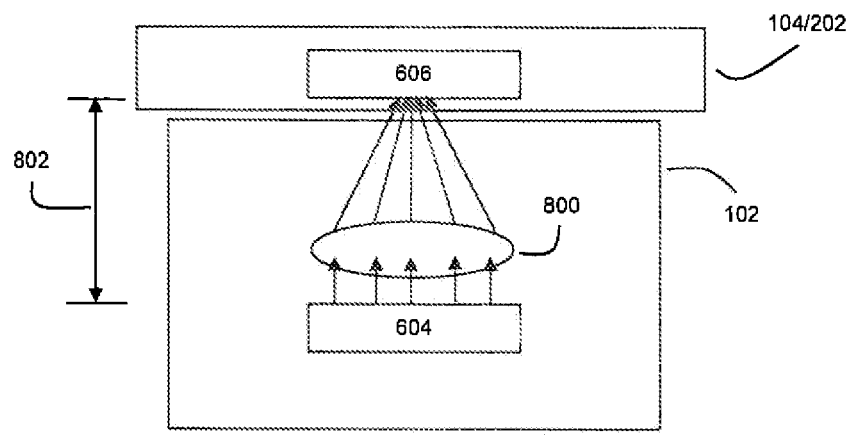
FIG. 8A depicts an example where a lens is used to focus a wireless data signal and extend the communication range between EHF near field transceivers.

FIG. 8A shows an example of a lens 800 that can be used for this purpose. In the example of FIG. 8A, lens 800 is formed from a material (e.g., a plastic) that conducive to the propagation of RF signals (e.g., more conductive than propagation over free space air), and it can be positioned in the base position assembly 810 to focus the wireless data signal from wireless data transmitter (e.g., 604) to a wireless data receiver (e.g. 606). In this fashion, lens 800 can extend the distance 802 between corresponding wireless data components 604/606, and thus provide a practitioner with more candidate options for positioning 604 and 606 relative to each other. Lens 800 can also be shaped to provide focusing, spreading, and/or directional steering effects for targeting the wireless data signal to a desired destination. Lens 800 can exhibit any of a number of shapes depending on the RF signal disbursement characteristics desired by a practitioner, such as a plano-convex lens, a convex-convex lens, a plano-concave lens, a concave-concave lens, or a concave-convex lens.

Figure 8B:
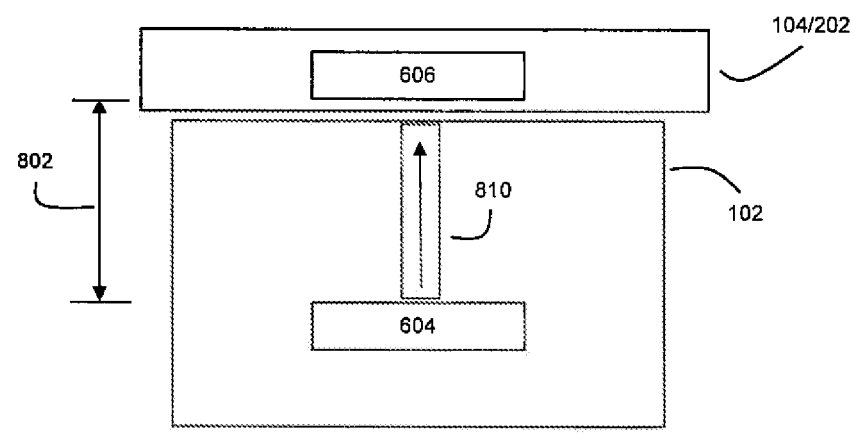
FIG. 8B depicts an example where a conduit is used to propagate a wireless data signal and extend the communication range between EHF near field transceivers.

FIG. 8B shows an example of a conduit 810 that can be used for the purpose of expanding distance or other positioning options as between the base position assembly 102 and/or electronic device 104 (or intermediary assembly 202). In the example of FIG. 8B, conduit 810 is formed from a material (e.g., a plastic) that conducive to the propagation of RF signals (e.g., more conductive than propagation over free space air). While the example of FIG. 8B shows a conduit 810 that exhibits a straight shape, it should be understood that the conduit 810 could exhibit more complex shapes to directionally steer the RF signal to a desired destination, and thereby provide a practitioner with alignment options where 604 and 606 need not be directly on top of each other when the electronic device 104 (or intermediary assembly 202) is resting on the base position assembly 102. Further still, the conduit 810 may be a solid material or it may be a hollow material with an aperture extending along its central longitudinal axis, depending on the desires of a practitioner. Further still, the conduit 810 may be formed from a flexible material that allows it to be bent or otherwise adjusted to permit flexible re-positioning of the electronic device 104 (or intermediary assembly 202) relative to the base position assembly 202 (e.g., see FIG. 11 discussed below).

While FIGS. 8A and 8B show the lens 800 and conduit 810 being located in the base position assembly 102, it should be understood that a lens 800 and/or conduit 810 could also or alternatively be located in the electronic device 104 (or intermediary assembly 202) if desired.

Figure 9A:
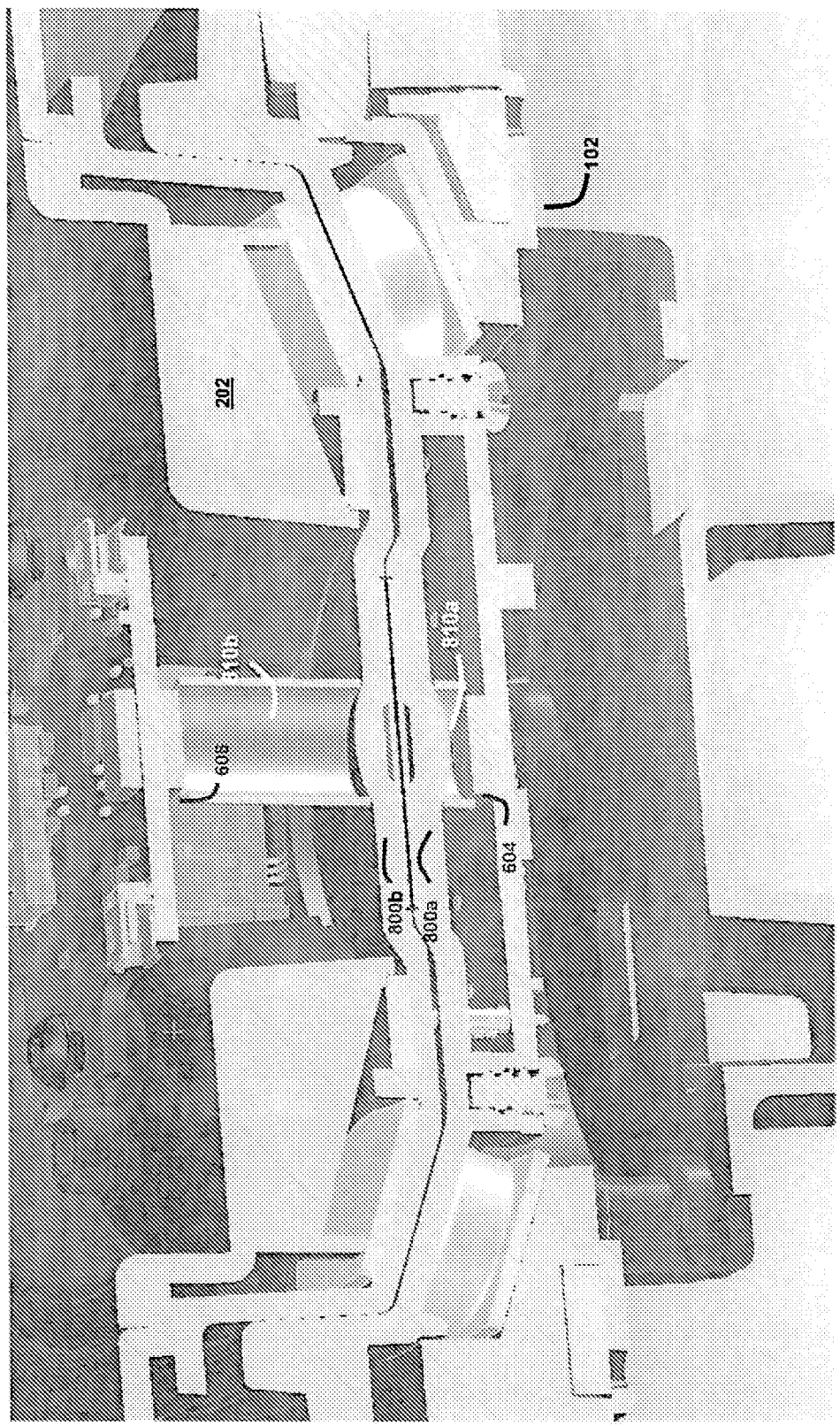
FIGS. 9A-9D depict example views for an embodiment where conduits and lenses to facilitate the propagation of wireless signals within the system.
Figure 9B:
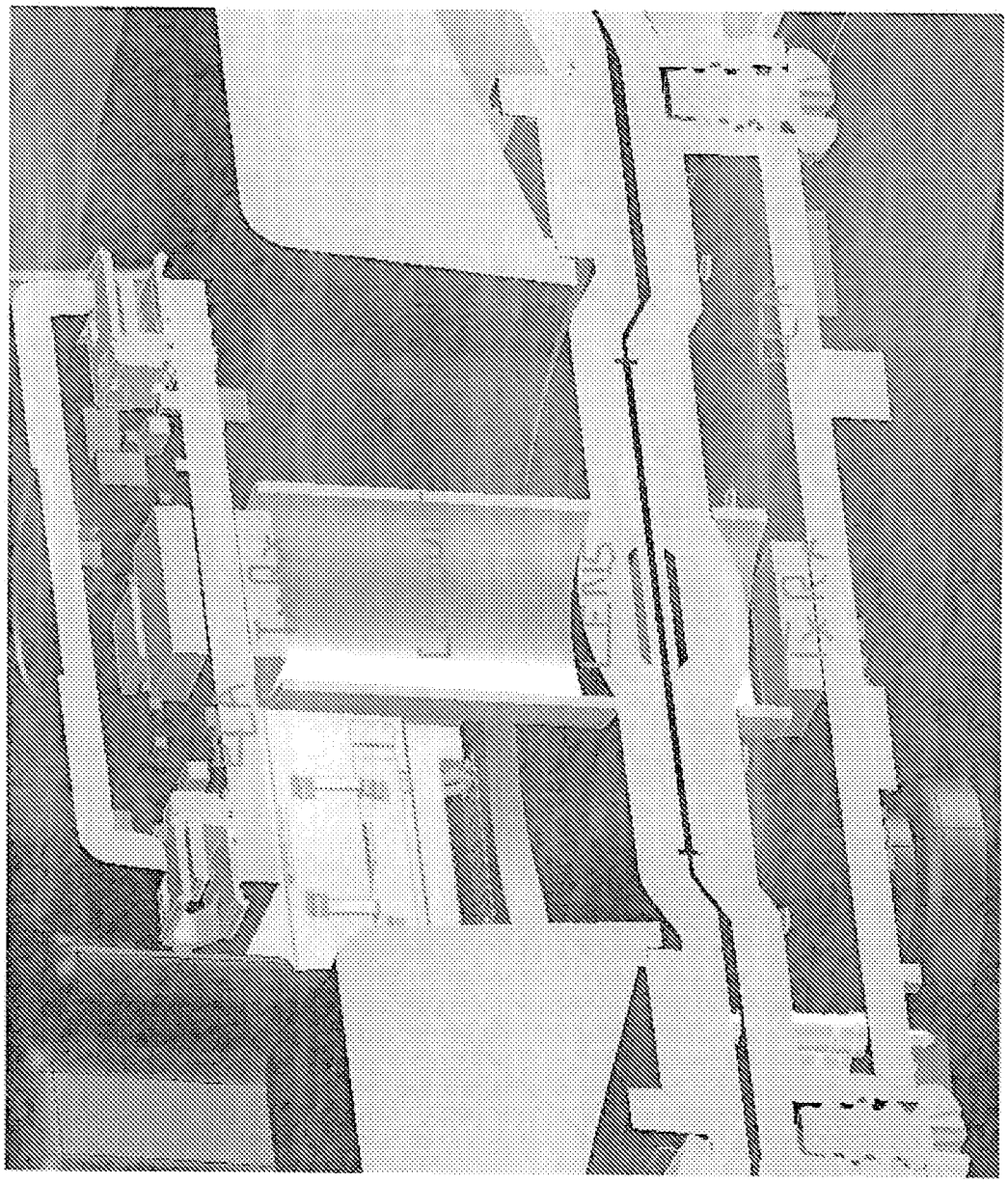
Figure 9C:
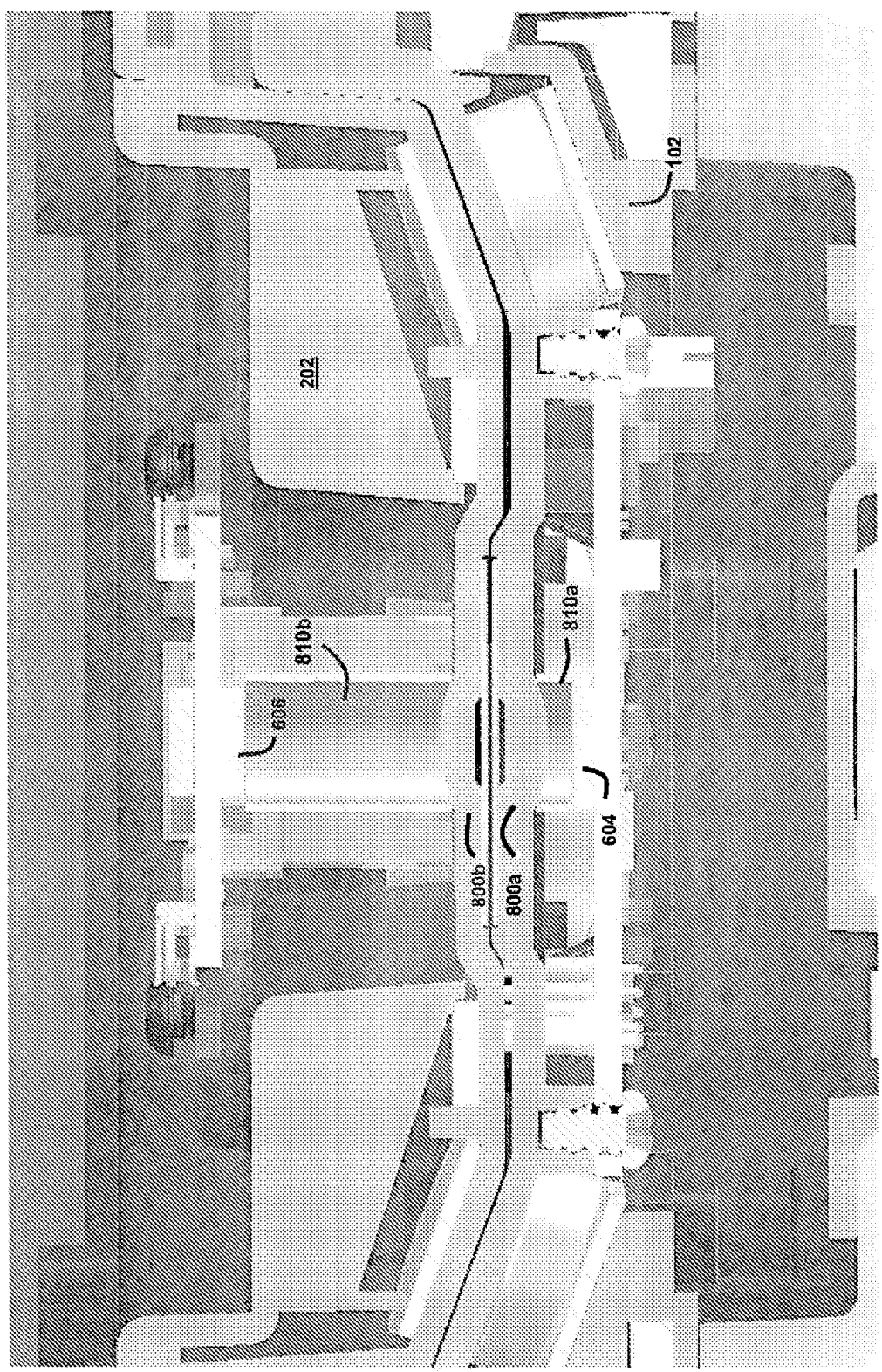

FIG. 9A depicts an example cross-sectional oblique view of a base platform assembly 102 and intermediary assembly 202 where lenses 800 (see 800a in base platform assembly 102 and 800b in intermediary assembly 202) and conduits 810 (see 810a in base platform assembly 102 and 810b in intermediary assembly 202) are used to extend the wireless data range as between transceivers 604 and 606. FIG. 9B shows another perspective view of the system shown by FIG. 9A; and FIG. 9C shows an orthogonal view of the system shown by FIG. 9A. In this example, the conduits 810a/810b can be hollow tubes whose inner surface along the central aperture is made of or treated with an RF reflective material that promotes the transmission of an RF signal from one of the conduit to the other. The length and diameter of the conduits 810a/810b can be varied depending on data transmission requirements. In the example of FIG. 9A, conduit 810b is approximately 19 mm long and 4.5 mm in diameter. Conduit 810a may be omitted by a practitioner if the base position assembly 102 permits sufficiently close proximity between the transceiver 604 and base surface. Also, it should be understood that the cross-sectional geometry of the conduit 810 is not limited to just circular. The propagation characteristics of the RF signal can be altered by various geometric constructs of the conduit 810. Examples of such geometric constructs may include but are not limited to (1) conduits with a tapered/conical shape, (2) conduits with a non-linear continuous shape (e.g., parabolic or other mathematical construct), (3) conduits with cross-sections of round, faceted, oval, elliptical, or rounded rectangular sections, and (4) conduits with any combination of linear transition and various cross-sections.

Figure 10:
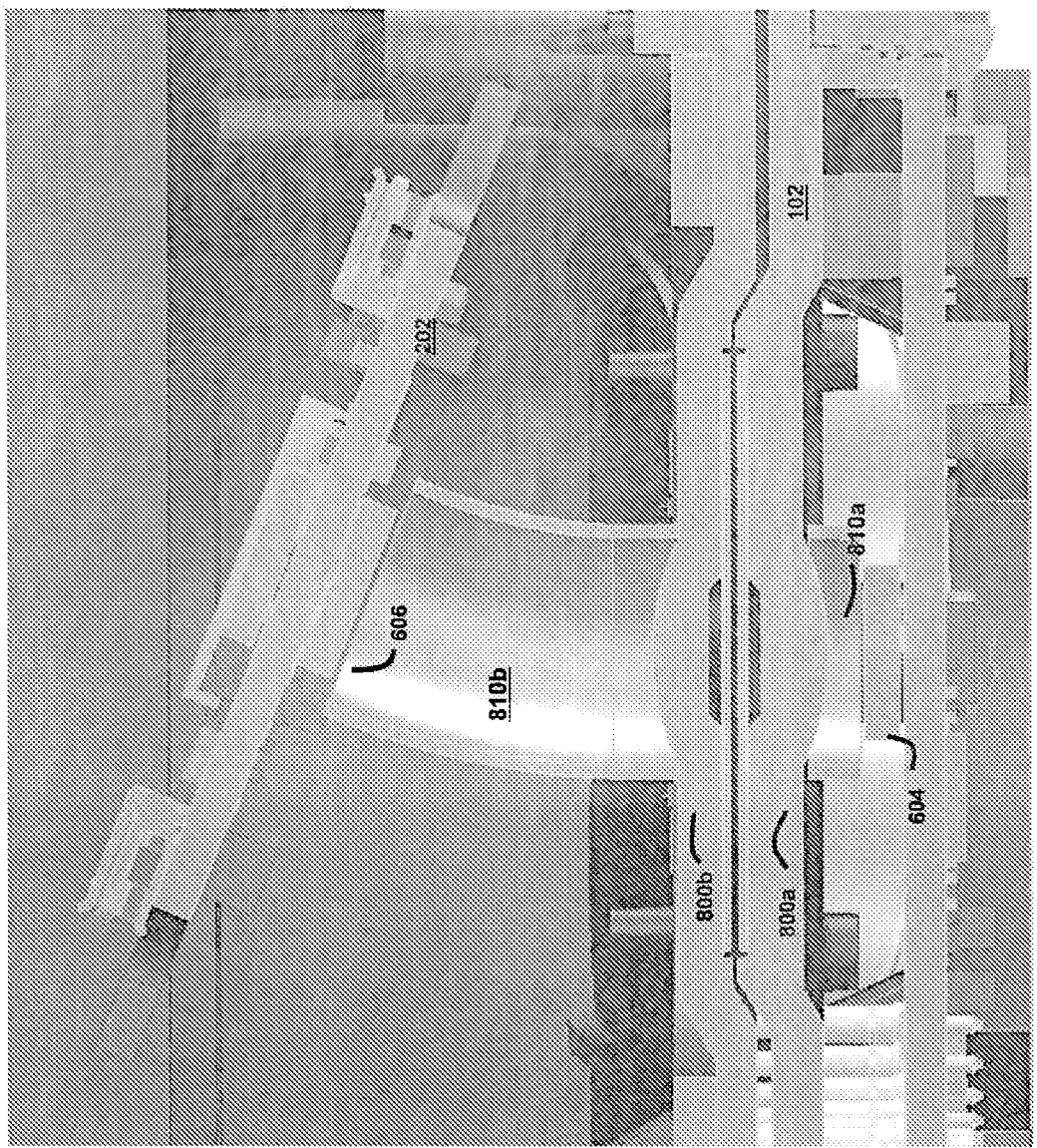
FIG. 10 depicts an example system where the conduit exhibits a curved shape.
Figure 11:
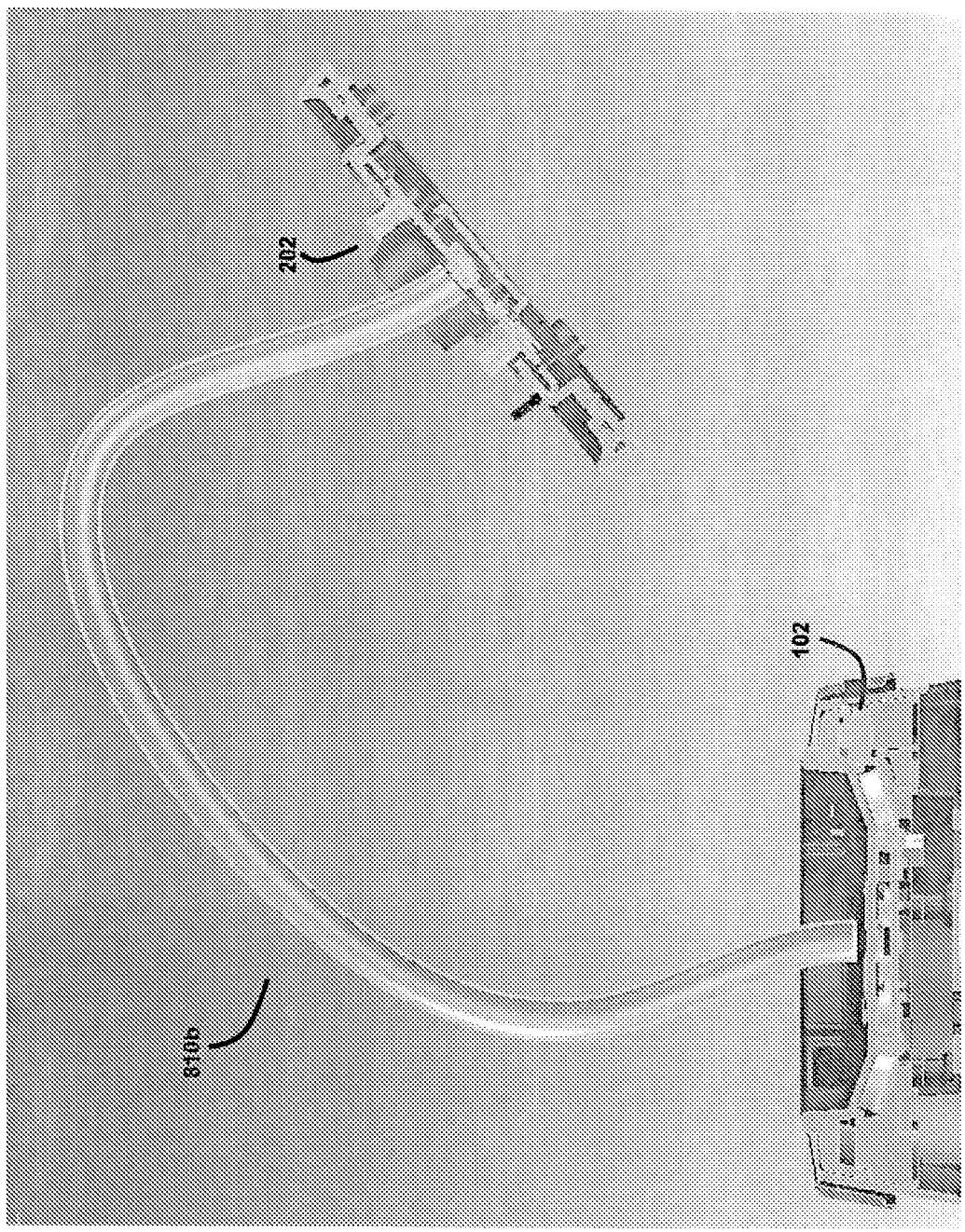
FIG. 11 depicts an example system where the conduit exhibits a serpentine or arbitrary shape.

Arced, curvilinear, or serpentine shapes for the conduit 810 may also be constructed to satisfy transmission from one location to another over longer distances. Such conduits 810 may also incorporate one or more cross section shapes and various sizes of cross sections in such a way to alter the RF transmission in any way desired by a practitioner. For example, FIG. 10 shows a cross-sectional view of an example system that includes a curved conduit 810b to promote the transmission of RF signals between 604 and 606 while allowing an electronic device to be oriented in a manner desired for ease of use by a user. As another example, FIG. 11 shows a cross-sectional view of an example system that includes a conduit 810b with a serpentine or arbitrary path. FIG. 11 thus shows how a continuous path of arbitrary length may be used between the base position assembly and the electronic device and/or intermediary assembly to afford a transmission path. An example embodiment of this arrangement is for the conduit 810 to be perpendicular to its connected devices (e.g., base position assembly, intermediary assembly, and/or electronic device) at each end; however some latitude can be permitted for angular intersection that may or may not adversely affect the integrity of the data transmission.

Figure 9D:
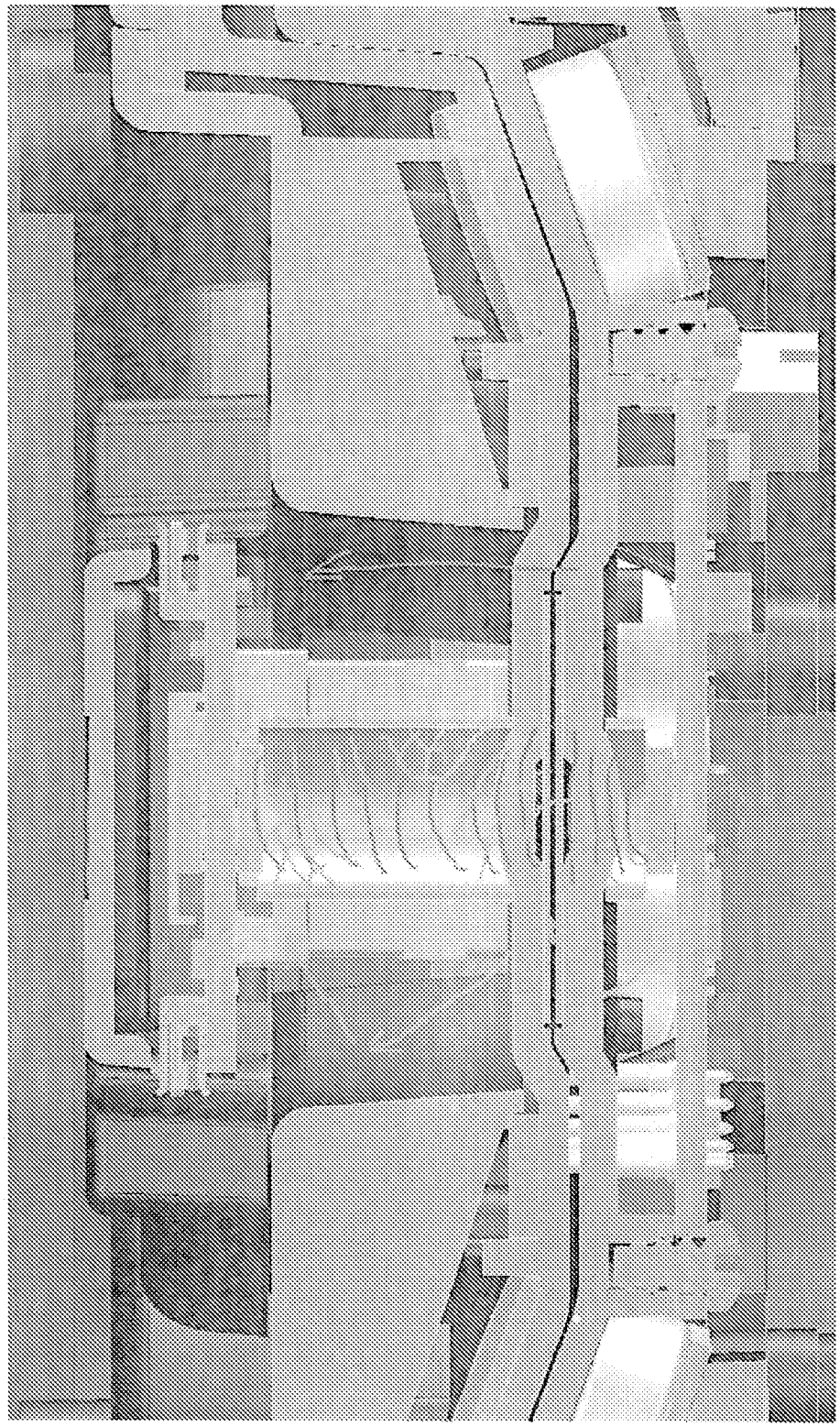

FIGS. 9A-9C also show that the system includes a lens in each of the base position assembly 102 and the intermediary assembly 202 (see 800a and 800b respectively). In this example, the lenses 800a and 800b are each plano-convex, and arranged to combine together as an effectively convex-convex aggregation. Lenses 800a and 800b are located at the interface between the base position assembly 102 and intermediary assembly 202 when they are brought into close proximity to each other. FIG. 9D shows how the lenses 800a and 800b can interact in combination with the conduits 810a and 810b to propagate RF signals along both straight paths and reflective paths where the signals bounce of the internal reflective surface of conduits 810a and 810b.

Figure 12A:
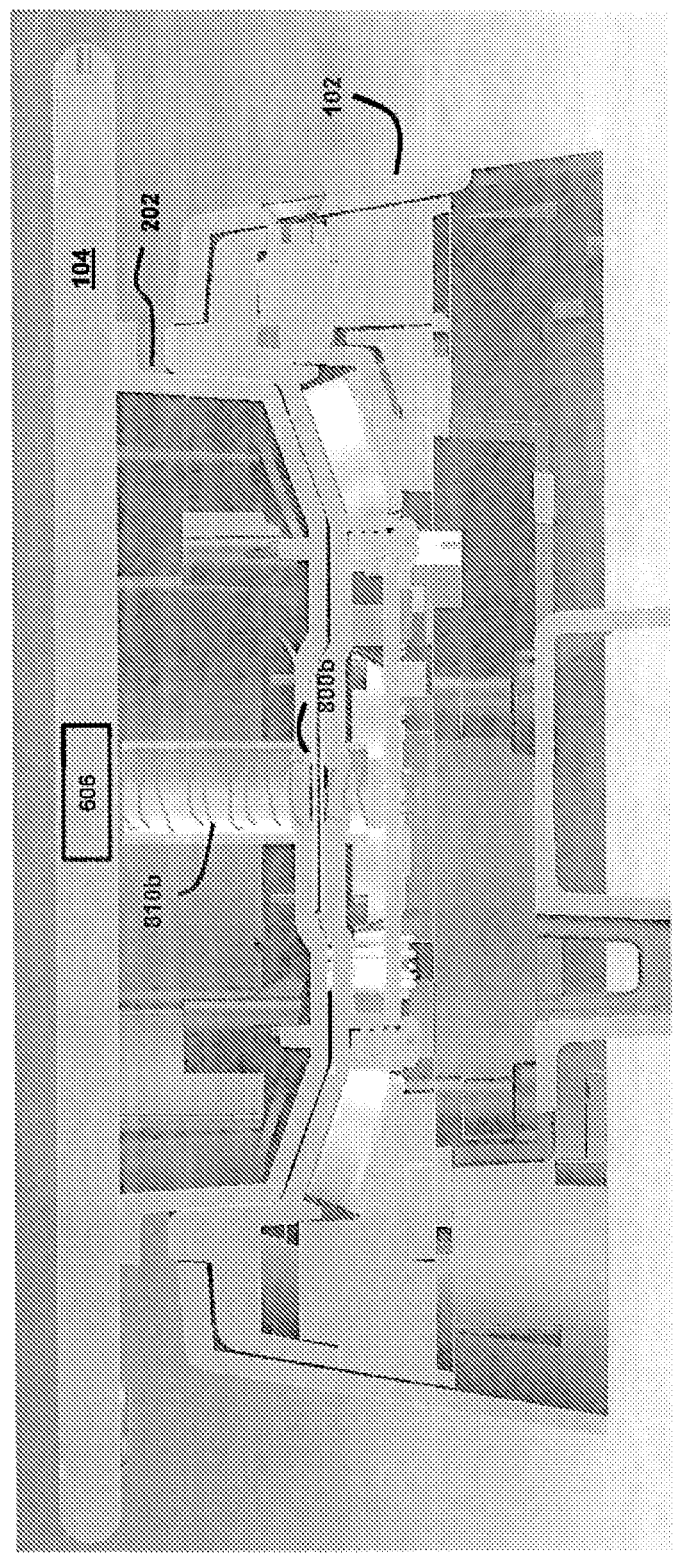
FIGS. 12A-C depict example views for another embodiment where conduits and lenses to facilitate the propagation of wireless signals within the system.
Figure 12B:
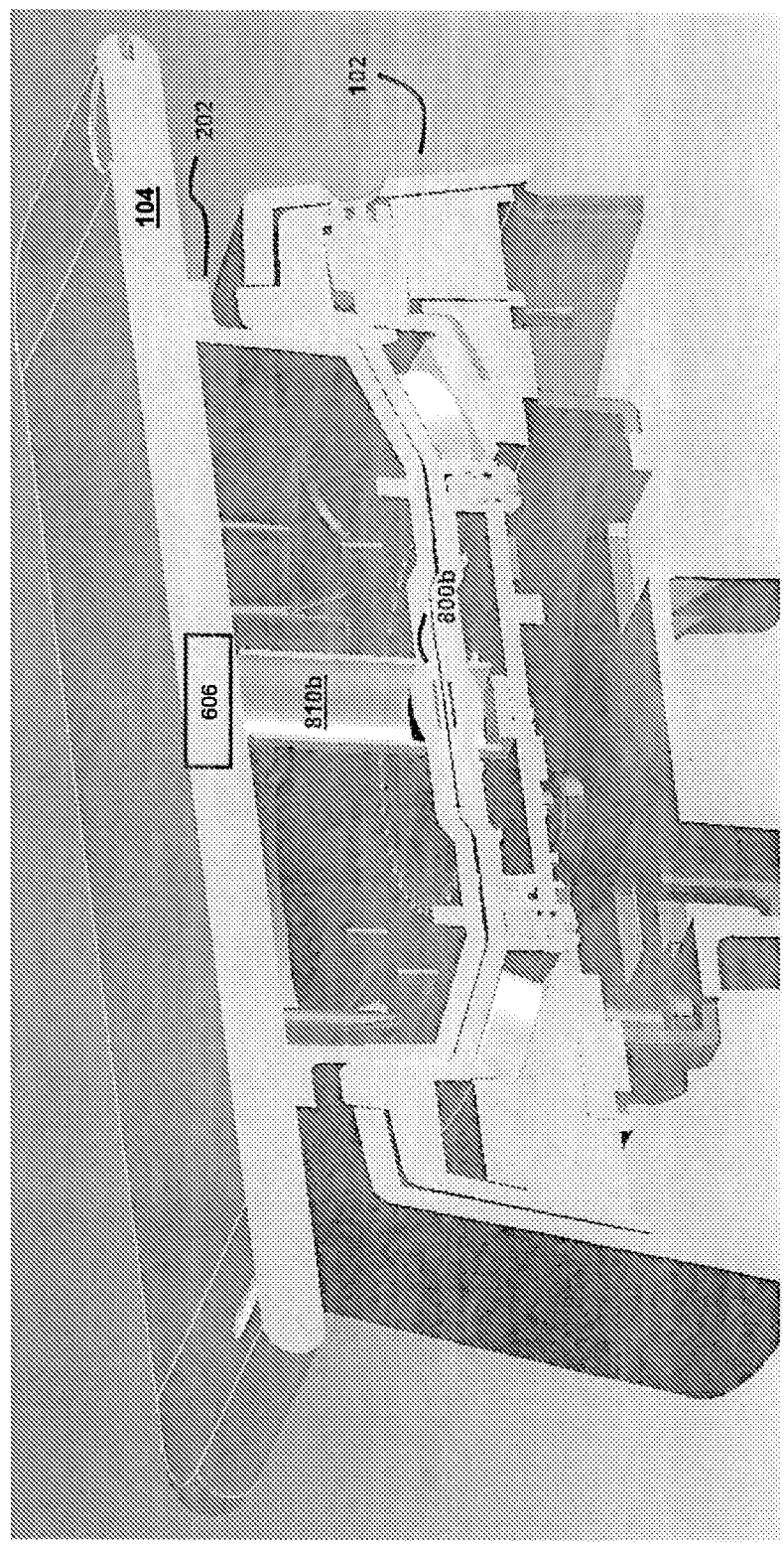
Figure 12C:
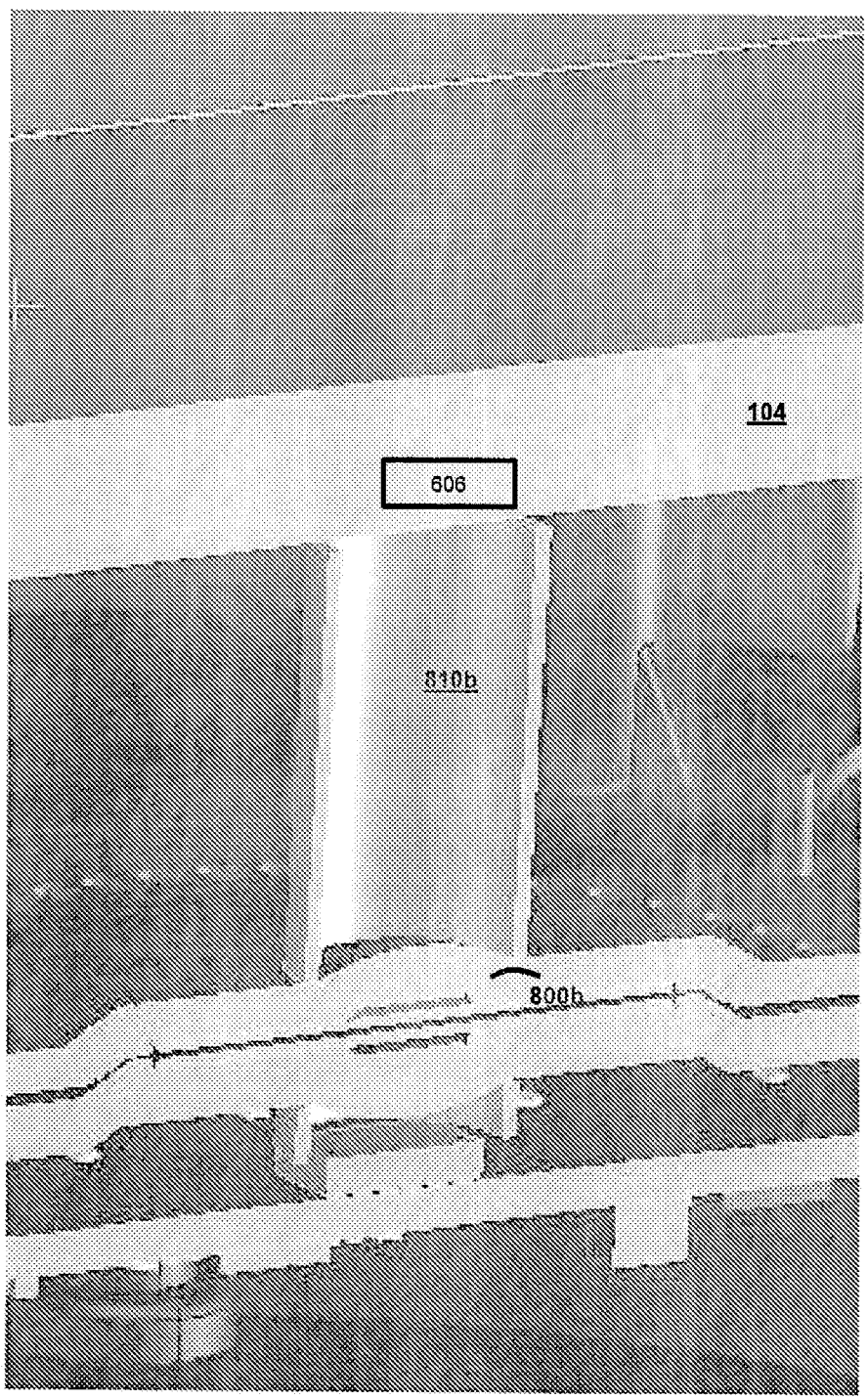

FIGS. 12A-C show examples where lenses 800 and conduits 810 are used in connection with a direct link with a transceiver 606 located in the electronic device 104. In these examples, the lens 800b and conduit 810b in the intermediary assembly 202 (such as a puck for a retail security position) propagate the RF signals to a transceiver 606 located inside the electronic device 104 (rather than to a transceiver 606 located inside the intermediary assembly 202). Such an arrangement can permit direct data communications between the base position assembly 102 and the electronic device 104 without needing to pass through processing circuitry in the intermediary assembly 202.

Figure 13A:
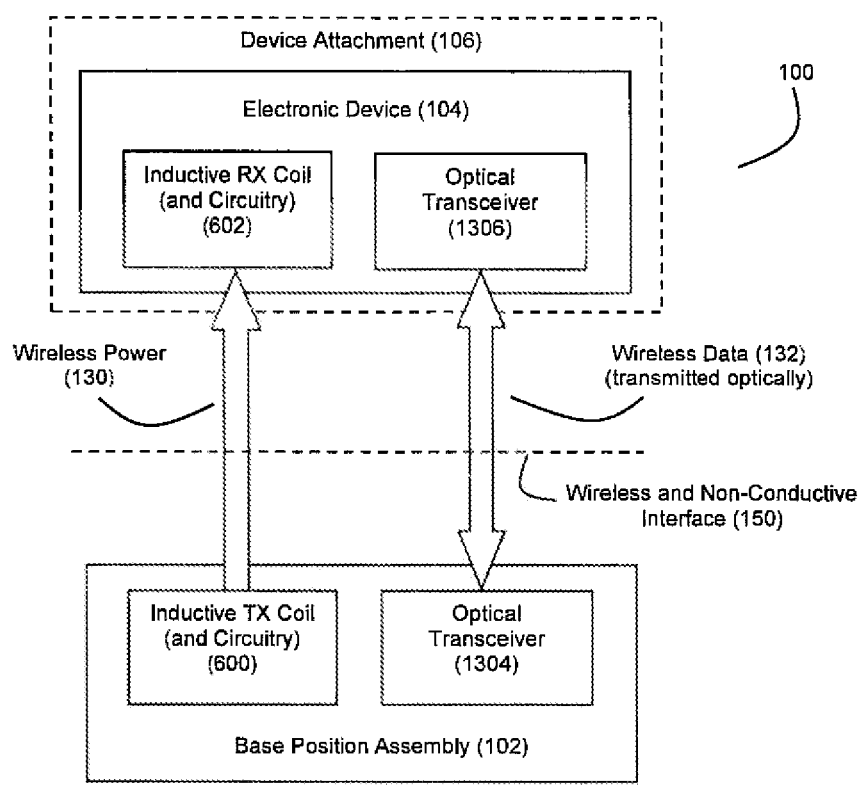
FIGS. 13A and 13B depict example systems that combine inductive coupling for wireless power transmission with optical transceivers for wireless data transmission.
Figure 13B:
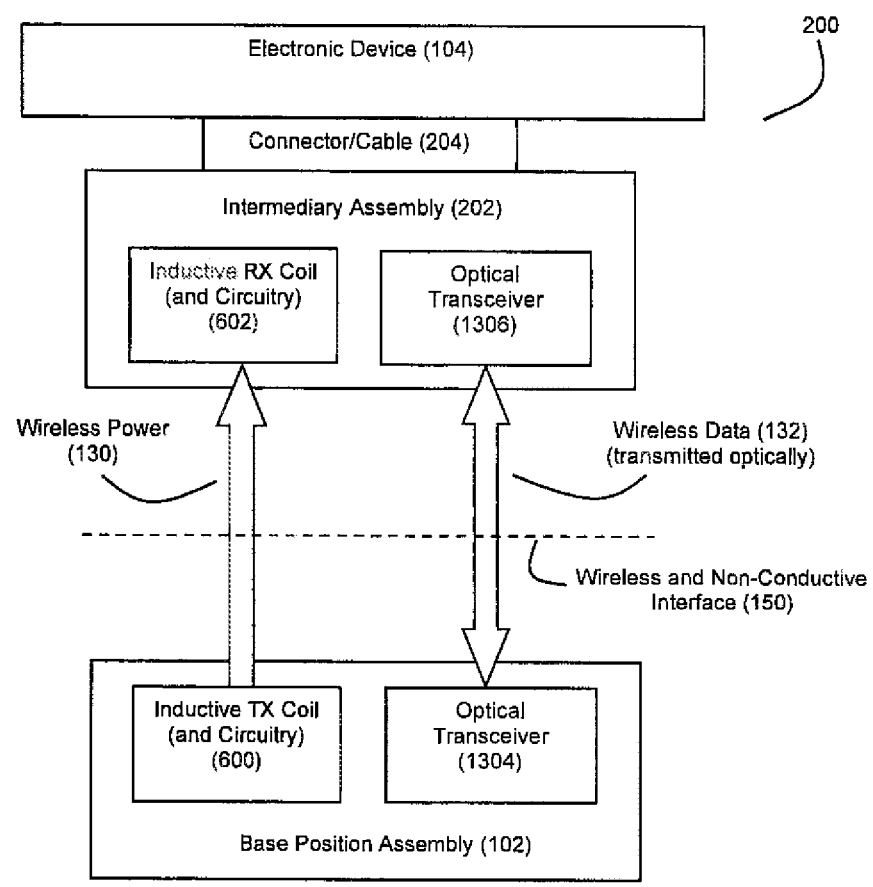

As another example, FIGS. 13A and 13B show example systems 100 and 200 respectively, where the wireless power transfer employs inductive RF coils 600 and 602 as wireless power transmitter 110 and wireless power receiver 120 respectively and where the wireless data transfer employs optical transceivers 1304 and 1306 as wireless data transceivers 112 and 122 respectively. The inductive coupling and optical communications can operate alongside each other with virtually no cross-interference. Moreover, alignment techniques such as those discussed above can be employed to align the coils 600/602 and optical transceivers 1304/1306 when the device 104 (which may include device attachment 106) and/or intermediary assembly 202 (and device 104) is placed on the base position assembly 102.

As yet another example, the wireless power transmitter 110, wireless power receiver 120, wireless data transceiver 112, and/or wireless data transceiver 122 can be designed to be adjustably positionable to provide users with more options for achieving alignment between complementary transmitters and receivers. In an example embodiment, the adjustability can be provided by an adjustable connector that allows for adjustable movement of a wireless power transmitter 110, wireless power receiver 120, wireless data transmitter 112, and/or wireless data transceiver 122 relative to the base position assembly 102, electronic device 104, and/or intermediary assembly 202 as applicable. In an example embodiment, this adjustable connector can comprise a flexible bridge that allows movement of a wireless power transmitter 110, wireless power receiver 120, wireless data transceiver 112, and/or wireless data transceiver 122 in two or three dimensions.

Further still, the adjustably positionable wireless power transmitter 110, wireless power receiver 120, wireless data transceiver 112, and/or wireless data transceiver 122 can be attachable to and detachable from the base position assembly 102, electronic device 104, and/or intermediary assembly 202 as applicable. Further still, this detachable and adjustably positionable wireless component can be used in combination with a base position assembly 102, electronic device 104, and/or intermediary assembly 202 as applicable in a manner that allows the wireless component to be swapped out for other transfer techniques. For example, in an embodiment where the wireless component is an inductive power transmitter that is included in an intermediary assembly 202 for delivering power to electronic device 104, the inductive power transmitter could be swapped out for a power cable that gets detachably connected to the intermediary assembly 202 for delivering an electrical current to the electronic device 104 in order to charge that electronic device 104 via non-inductive techniques.

Figure 14A:
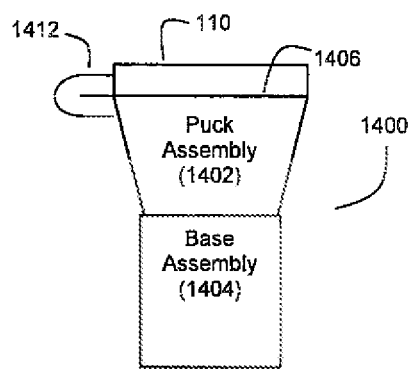
FIGS. 14A-C depict an example product display assembly with a wireless power transmitter that is located in a first adjustable position.
Figure 14B:
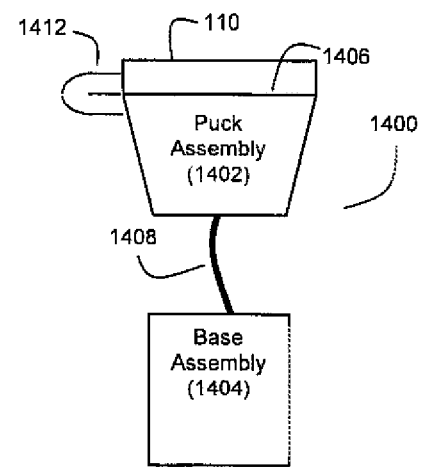

FIG. 14A depicts an example embodiment where the adjustably positionable wireless component can take the form of a wireless power transmitter 110 (e.g., an inductive coil that serves as an inductive charger for an electronic device 104), where the wireless power transmitter 110 is included as part of an intermediary assembly 202 such as the puck assembly 1402 of product display assembly 1400. Thus, in the example of FIG. 14A, there can be a wireless interface between the intermediary assembly 202 and electronic device 104. FIG. 14A shows the wireless power transmitter 110 located in a first adjustable position. In this example, the product display assembly 1400 includes puck assembly 1402 and a base assembly 1404. The puck assembly 1402 can be moved between a rest position where it engages with the base assembly 1404 (see FIG. 14A) and a lift position where it disengages from the base assembly 1404 (see FIG. 14B). A tether 1408 may be used to maintain a connection between the puck assembly 1402 and the base assembly 1404 even when the puck assembly 1402 is in the lift position, as shown by FIG. 14B. However, as noted above, this tether 1408 can be omitted if desired by a practitioner.

Figure 14C:
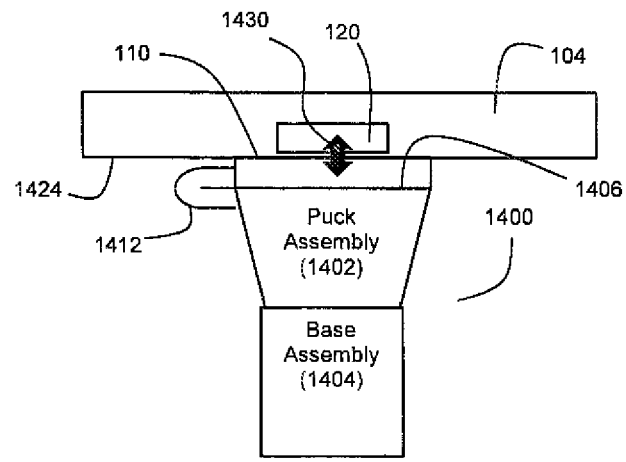

The wireless power transmitter 110 can be connected to the puck assembly 1402 via an adjustable connector 1412. This adjustable connector 1412 is adapted to allow the wireless power transmitter 110 to be moved relative to the puck assembly 1402. In the examples of FIGS. 14A-C, the wireless power transmitter 110 is positioned such that it rests on upper surface 1406 of the puck assembly 1402. With this arrangement, an electronic device 104 can be positioned such that its back surface 1424 engages with the wireless power transmitter 110 in a manner where the wireless power receiver 120 (e.g., an inductive charging element) of the electronic device 104 is positioned sufficiently near the wireless power transmitter 110 to allow inductive charging 1430 to take place (see FIG. 14C). The electronic device 104 can thus be inductively charged using the wireless power transmitter 110 while the electronic device 104 is presented to customers via the product display assembly 1400. The electronic device 104 can be any electronic device suitable for display via product display assembly 1400 and capable of being inductively charged. Examples of suitable electronic devices 104 can include smart phones, tablet computers, and wearables such as smart watches.

Figure 14D:
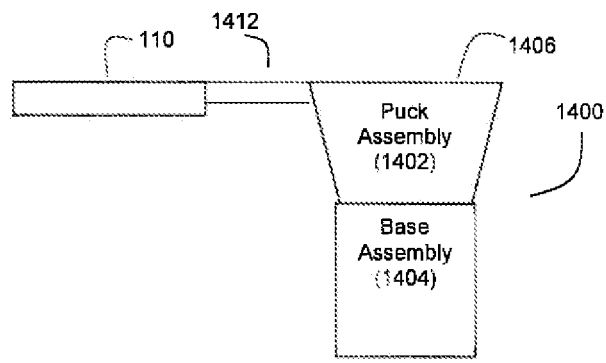
FIGS. 14D-F depict the example product display assembly of FIGS. 14A-C where the wireless power transmitter is located in a second adjustable position.
Figure 14E:
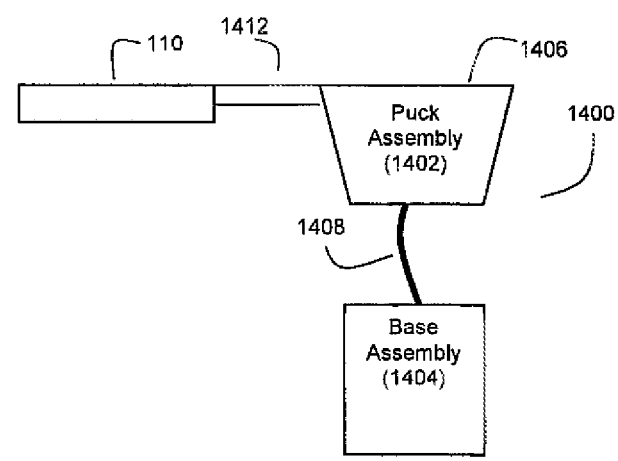
Figure 14F:
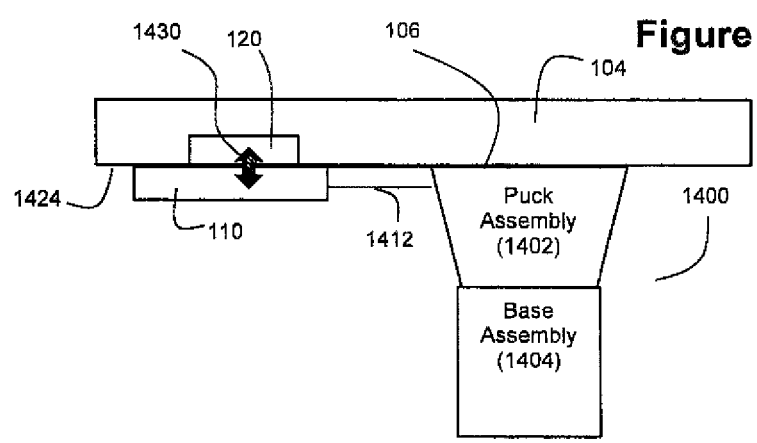
Figure 14G:
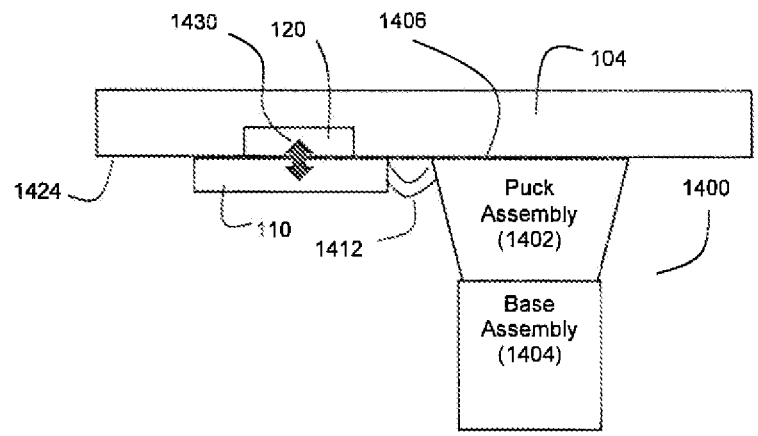
FIG. 14G the example product display assembly of FIGS. 14A-C where the wireless power transmitter is located in a third adjustable position.

FIGS. 14D-14F depict the product display assembly 1400 and wireless power transmitter 110 of FIGS. 14A-C, but where the wireless power transmitter 110 is moved to a second adjustable position via the adjustable connector 1412. In this example, the adjustable connector 1412 has been unfolded so that the wireless power transmitter 110 is positioned laterally distant from the puck assembly 1402. FIG. 14D shows the product display assembly 1400 and wireless power transmitter 110 in this second adjustable position where the puck assembly 1402 is in the rest position. FIG. 14E shows the product display assembly 1400 and wireless power transmitter 110 in this second adjustable position where the puck assembly 1402 is in the lift position. FIG. 14F shows the product display assembly 1400 and wireless power transmitter 110 in this second adjustable position where electronic device 104 is positioned such that its back surface 1424 contacts the wireless power transmitter 110 and the upper surface 1406 of the puck assembly 1402. Relative to FIG. 14C, in this instance, the wireless power receiver 120 of the electronic device 104 is positioned toward one of the ends of the electronic device 104 as shown by FIG. 14F. Thus, with the adjustment of the wireless power transmitter 110 to the second adjustable position in FIG. 14F, the wireless power transmitter 110 is sufficiently close to wireless power receiver 120 to allow inductive charging 1430 to take place. FIG. 14G shows an example where the wireless power transmitter 110 is adjusted to a third adjustable position, leveraging the flexibility of adjustable connector 1412 (and thereby accommodating an electronic device 104 where the wireless power receiver 120 is in a different location).

Examples of product display assemblies 1400 that include puck assemblies and base assemblies and which can be adapted for use in the practice of the example embodiments of FIGS. 14A-G are disclosed in U.S. Pat. Nos. 8,558,688, 8,698,617, 8,698,618, 9,786,140; 10,026,281, and U.S. Patent Application Publication Nos. 2017/0164314, 2017/0300721, 2018/0049563, and 2018/0288720, the entire disclosures of each of which are incorporated herein by reference. For example, with these designs, the puck assembly 1402 can receive power from a power source via the base assembly 1404 when the puck assembly 1402 is at rest. Contacts included on the puck assembly 1402 and base assembly 1404 can contact each other when the puck assembly 1402 is at rest, thereby forming an electrical connection through which power can be delivered from a power source (not shown) to the puck assembly 1402 via the base assembly 1404 and the electrical connection formed by the contacts. When the puck assembly 1402 is lifted, the contacts lose contact with each other, thereby breaking the electrical connection. Optionally, a battery or other power storage device can be included in the puck assembly 1402 to store power for use by the puck assembly 1402 when the puck assembly 1402 is in the lift position. This stored power can be used to run puck functions (e.g., security functions, tracking functions, etc.) while the puck assembly 1402 is in the lift position. For example, if the battery or other power storage device has sufficient capacity and permits a sufficient power draw, the wireless power transmitter 110 can draw on power stored by the battery or other power storage device when the puck assembly 1402 is in the lift position. However, as noted above, there could alternatively be a wireless interface 150 between the base assembly 1404 and puck assembly 1402 if desired by a practitioner (where examples of such wireless interfaces 150 are discussed above).

Figure 15A:
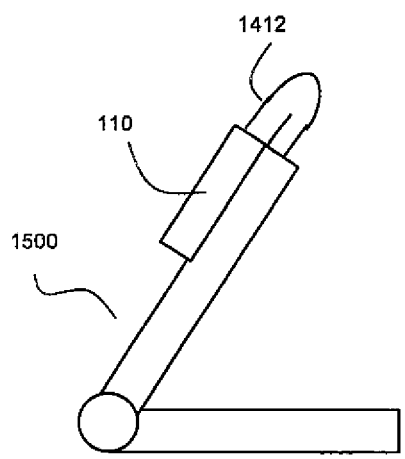
FIGS. 15A and 15B depict another example product display assembly with wireless power transmitter that is located in first and second adjustable positions.
Figure 15B:
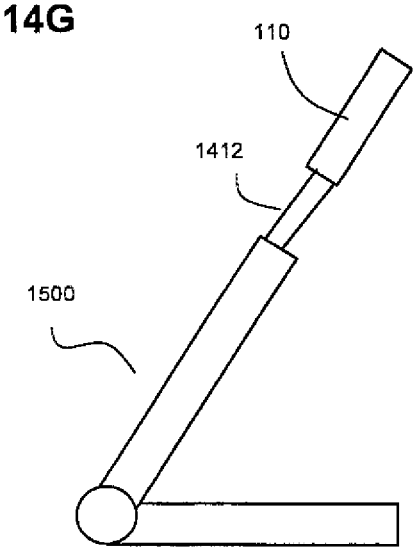

While the examples of FIGS. 14A-G show a product display assembly 1400 that includes a puck assembly 1402 and a base assembly 1404, it should be understood that other designs could be used in combination with the adjustably positionable wireless component (such as an adjustably positionable wireless power transmitter 110). For example, FIGS. 15A and 15B show an example product display assembly 1500 arranged as a stand or pedestal without a liftable puck. FIG. 15A shows such a product display assembly 1500 where the wireless power transmitter 110 is in a first adjustable position, while FIG. 15B shows such a product display assembly 1500 where the wireless power transmitter 110 is in a second adjustable position. Still other adjustable positions may be accommodated in examples where the adjustable connector 1412 is flexible.

In the examples of FIGS. 14A-G and 15A-B, the wireless power transmitter 110 can include an inductive transmit coil that allows power to be inductively transferred from the wireless power transmitter 110 to the proximate wireless power receiver 120. The wireless power receiver 120 can take the form of an inductive receive coil. The wireless power transmitter 110 may also include additional elements, as explained below.

Figure 16:
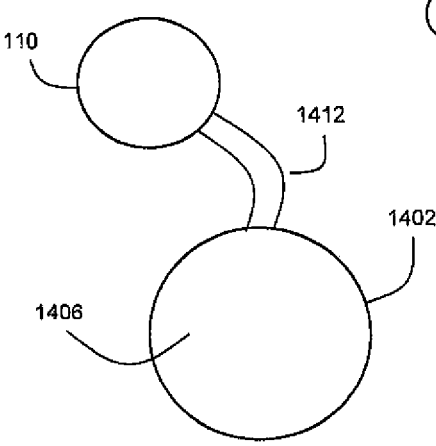
FIG. 16 depicts a top view of an example embodiment where the product display assembly includes a puck assembly and where the wireless power transmitter can be adjustably positioned in multiple dimensions relative to the puck assembly.

In an example embodiment, the adjustable connector 1412 can take the form of a flexible bridge that includes conductors that pass current to and from the wireless power transmitter's transmit coil. This flexible bridge can be formed from a material that is sufficiently flexible to allow the bridge to be easily moved between the folded and unfolded positions shown in FIGS. 14A-14G. Furthermore, the adjustable connector 1412 can be adapted to allow for lateral displacement of the wireless power transmitter 110 relative to the puck assembly 1402 as shown by way of example in FIG. 16. FIG. 16 is a top down view of showing the upper surface 1406 of the puck assembly 1402 with the wireless power transmitter 110 moved to a position away from the puck assembly 1402. From the frame of reference shown by the top down view of FIG. 16, the adjustable connector 1412 in this example allows the wireless power transmitter 110 to also be displaced not only vertically relative to the puck assembly 1402 but also horizontally relative to the puck assembly 1402. Such an ability to re-position the wireless power transmitter 110 in multiple dimensions relative to the puck assembly 1402 can provide users with even more flexibility for ensuring that the wireless power transmitter 110 can be positioned sufficiently close to the wireless power receiver 120 of the electronic device 104 so that inductive charging can take place. It should also be understood that the adjustable connector 1412 can be adapted to allow for adjustment of the wireless power transmitter 110 in three dimensions if desired by a practitioner.

While the adjustable connector 1412 in an example embodiment is formed from a flexible material that allows for sufficient bending, twisting, and/or stretching (such as deformable, bendable plastics, rubbers, etc.) to provide for the variable positioning of the wireless power transmitter 110 discussed herein, it should be understood that the adjustable connector 1412 need not necessarily be formed from a flexible material. For example, the adjustable connector 1412 can be formed from a rigid material such as a hard plastic or the like but including hinges or the like to provide the variable positioning of the wireless power transmitter 110. An example of such a design for the adjustable connector 1412 can be an articulating arm formed from a rigid material but including hinges or other joints that allow for movement of the wireless power transmitter 110 in one or more dimensions.

It should be appreciated from FIGS. 14A-G, 15A-B, and 16 that the adjustable connector 1412 allows the product display assembly 1400/1500 to inductively charge a wide array of different electronic devices 104 even when those electronic devices 104 have wireless power receivers 120 located in different positions. FIGS. 17A-D depict various examples of potential different configurations for electronic devices 104 with respect to where the wireless power receiver 120 is located. In these examples, the electronic device 104 is a smart phone that includes a touchscreen 1700 and user input button 1702 on its front surface. However, it should be readily understood that the electronic device 104 of FIGS. 17A-D could also be other types of smart phones or electronic devices.

Figure 17A:
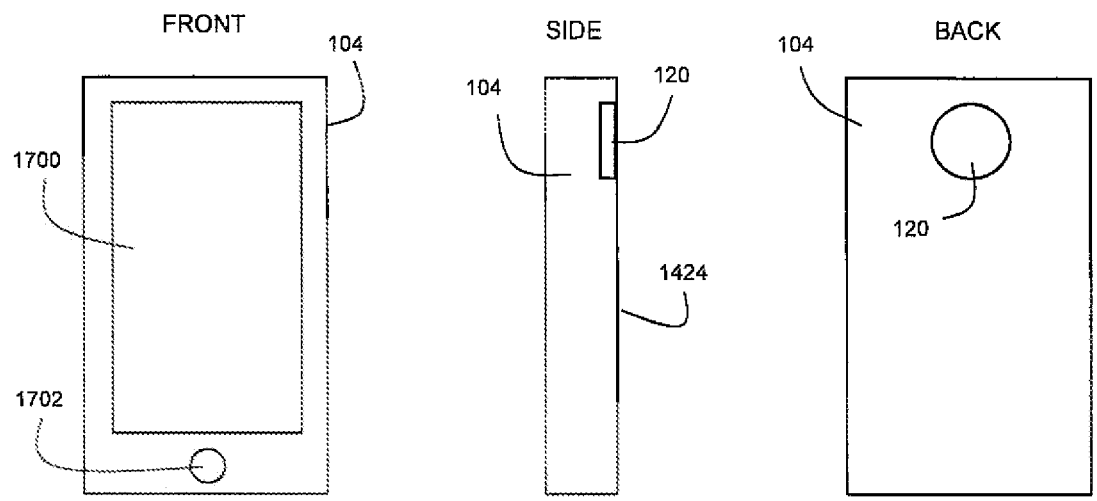
FIGS. 17A-D depict examples of how electronic devices can have wireless power receivers at various locations on the electronic devices.

FIG. 17A shows front, side, and back views of the smart phone where the wireless power receiver 120 is positioned near the back surface 1424 and toward the top of the smart phone (along the vertical dimension of FIG. 17A). It can also be seen that the wireless power receiver 120 is largely centered along the width of the smart phone (along the horizontal dimension of FIG. 17A).

Figure 17B:
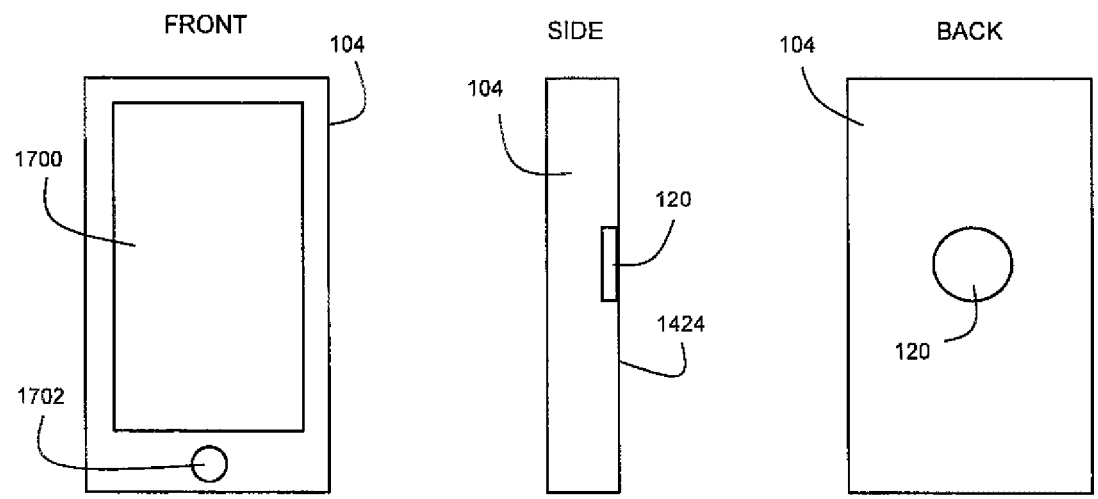

FIG. 17B shows front, side, and back views of the smart phone where the wireless power receiver 120 is positioned near the back surface 1424 and toward the middle of the smart phone (along the vertical dimension of FIG. 17B). It can also be seen that the wireless power receiver 120 is largely centered along the width of the smart phone (along the horizontal dimension of FIG. 17B).

Figure 17C:
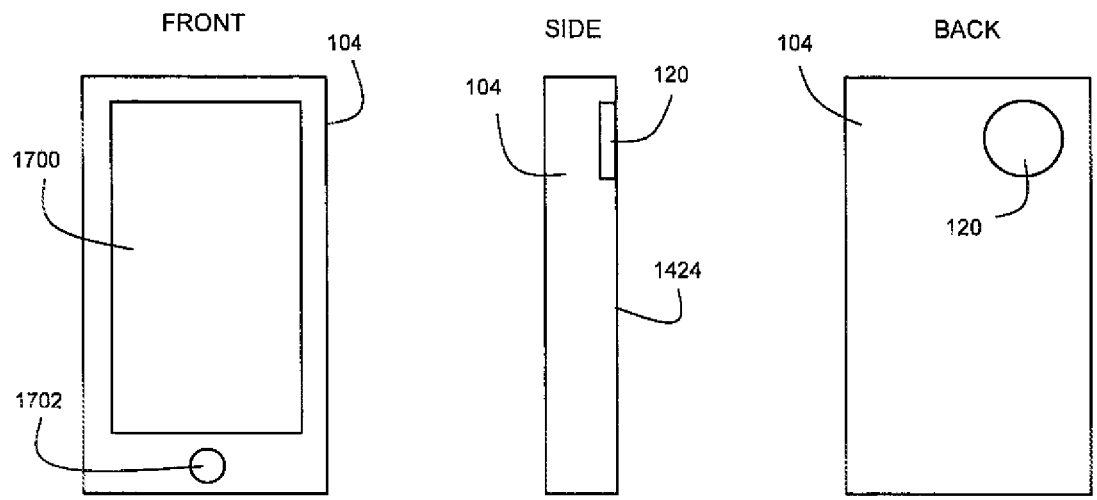

FIG. 17C shows front, side, and back views of the smart phone where the wireless power receiver 120 is positioned near the back surface 1424 and toward the top of the smart phone (along the vertical dimension of FIG. 17C). It can also be seen that the wireless power receiver 120 is positioned toward the right lateral side (with respect to the back view) along the width of the smart phone (along the horizontal dimension of FIG. 17C).

Figure 17D:
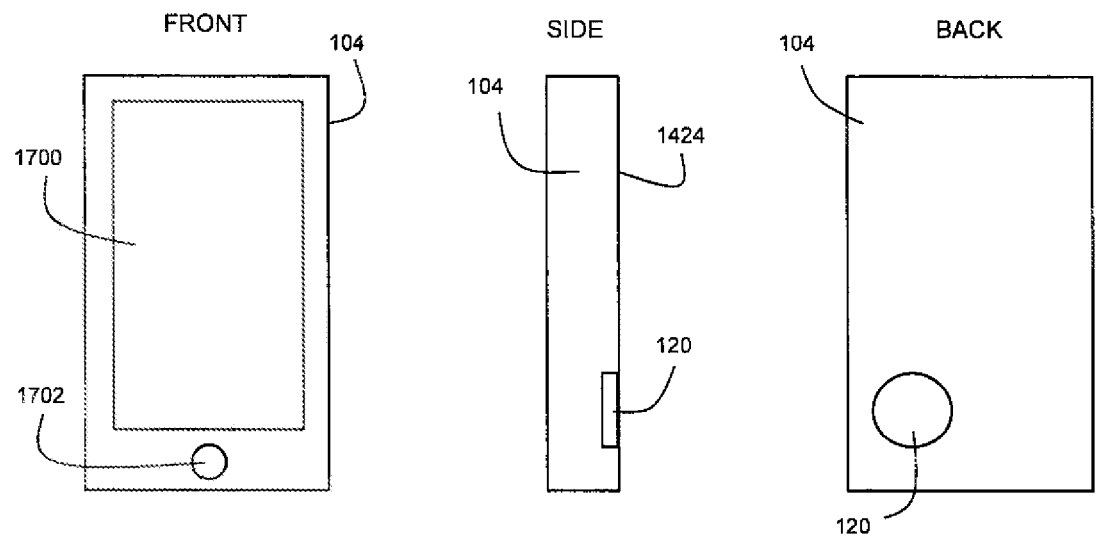

FIG. 17D shows front, side, and back views of the smart phone where the wireless power receiver 120 is positioned near the back surface 1424 and toward the bottom of the smart phone (along the vertical dimension of FIG. 17D). It can also be seen that the wireless power receiver 120 is positioned toward the left lateral side (with respect to the back view) along the width of the smart phone (along the horizontal dimension of FIG. 17D).

The adjustably positioned wireless power transmitter 110 can allow the product display assembly 1400/1500 to support a wide variety of electronic devices 104 such as those shown by FIGS. 17A-D.

Figure 18:
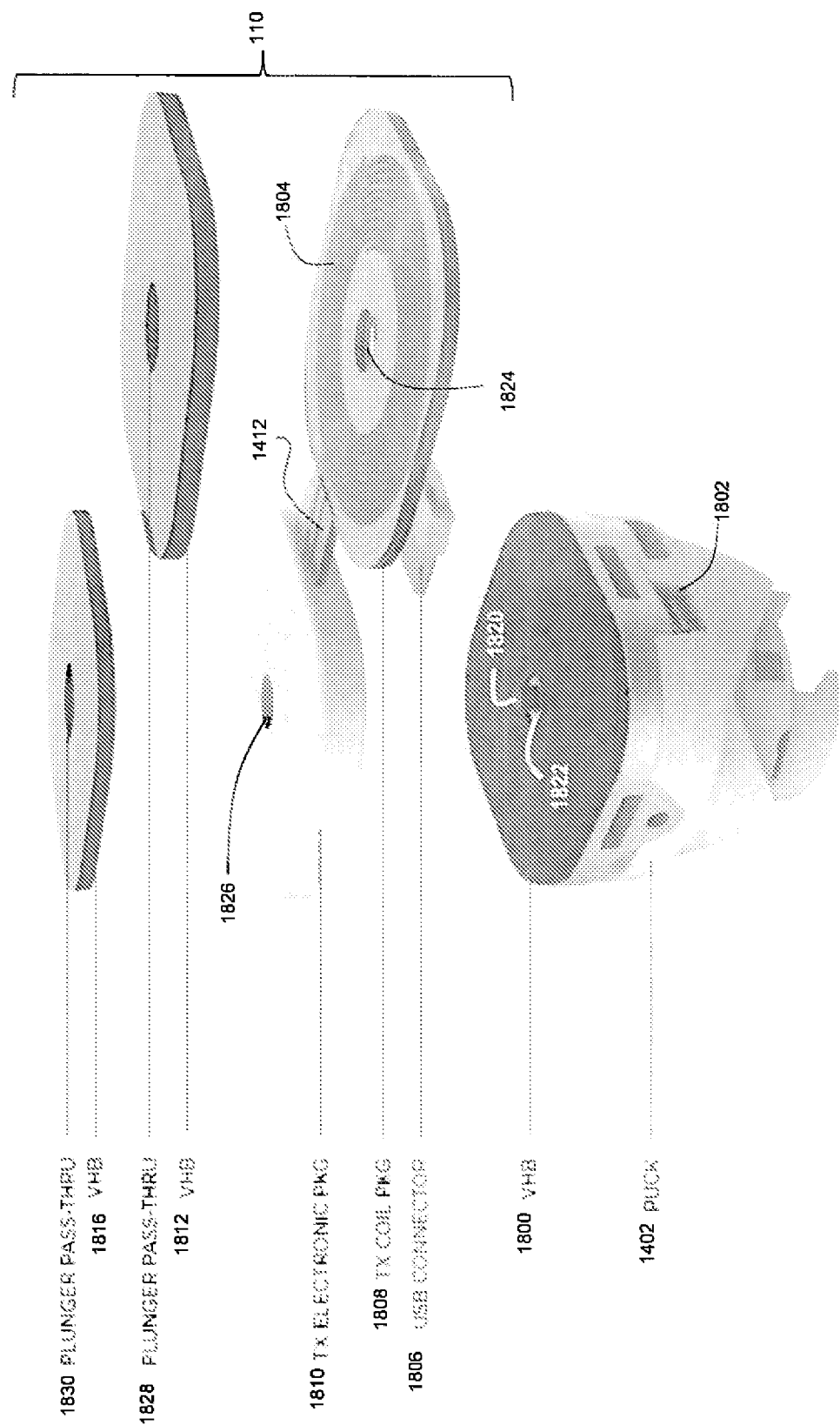
FIG. 18 depicts a component view of an example puck assembly with an example embodiment of an adjustably positionable wireless power transmitter.

FIG. 18 shows a component view of an example embodiment of the wireless power transmitter 110 for use with a puck assembly 1402 as exemplified by FIGS. 14A-G. In this example, the wireless power transmitter 110 includes a first portion that is attached to the puck assembly 1402 via an adhesive 1800 such as an adhesive pad (e.g., a Very High Bond (VHB) pad) and a second portion that can be adjustably positioned relative to the puck assembly 1402.

The first portion can include an enclosure 1810 with an electrical circuit that drives the wireless power transmitter 110. The second portion can include a pad 1808 that includes a transmit inductive coil 1804. The electrical circuit enclosed by enclosure 1810 can be any suitable drive circuit that conditions an incoming power signal for transferring power via inductive coupling between the transmit inductive coil 1804 and a corresponding receive coil of the wireless power receiver 120. The adjustable connector 1412 can connect the enclosed electrical circuit with the transmit inductive coil 1804 via conductors. For labeling purposes, the pad 1808 can be described as a "transmit coil package" (see FIG. 18) or a "transmit coil flex-circuit" (see FIG. 19), and enclosure 1810 can be described as a "transmit electronics package".

As mentioned above, the adjustable connector 1412 can take the form of a flexible bridge with internal conductors for passing current to and from the coil 1804. The flexible bridge can be formed from suitably flexible plastics, rubbers, etc. that would allow for movement of the pad 1808 as discussed herein. As indicated above, such movements can include a folding action where the pad 1808 is re-positioned to be above or over the puck assembly 1402 and/or a bending or twisting action sufficient to laterally displace the pad 1808 relative to the puck assembly 1402 as indicated by FIG. 16.

As shown by FIG. 18, the pad 1808 and enclosure 1810 can have a form factor that is largely planar to allow for engaging with the upper surface 1406 of puck assembly 1402. In this regard, it can be seen that the pad 1808 and enclosure 1810 have largely flat upper and lower surfaces characterized by a length and width much greater than their thickness. The planar shape can be varied to suit the desires of a practitioner. While the example of FIG. 18 shows a largely square shape with rounded corners, it should be understood that other shapes could be used (e.g., rectangular, circular, elliptical, etc.).

The wireless power transmitter 110 may also include adhesives 1812 and 1816 (such as adhesive pads (e.g., VHB pads as shown by FIG. 18)) that are located on the upper surfaces of the pad 1808 and enclosure 1810. These adhesives 1812 and 1816 allow for a secure engagement with an electronic device 104. It should be understood that the thickness for adhesive pad 1812 should be sufficiently thin to allow for energy transfer from the coil 1804 to the corresponding wireless power receiver 120 of the electronic device 104 when the electronic device 104 is positioned on the adhesive pad 1812.

To accommodate a pressure or plunger button 1820 that would protrude from the upper surface 1406 of the puck assembly 1402 (where this plunger button 1820 serves as a security sensor for the assembly 1400), the adhesive pad 1800 and various components of the wireless power transmitter 110 can include an aperture that is positioned to allow the plunger button 1820 to pass through (see apertures 1822, 1824, 1826, 1828, and 1830). For labeling purposes, these apertures can be referred to as plunger pass-thrus in FIG. 18. In an example where the plunger button 1820 is centered on the upper surface 1406 of the puck assembly 1402, this means that (1) aperture 1822 can be centered through the middle of adhesive pad 1800, (2) aperture 1824 can be centered through the middle of pad 1808, (3) aperture 1826 can be centered through the middle of enclosure 1810, (4) aperture 1828 can be centered through the middle of adhesive pad 1812, and (5) aperture 1830 can be centered through the middle of adhesive pad 1816.

FIG. 18 also discloses that the puck assembly 1402 can include an interface 1802 that is adapted to connect with a cable 1900 (see FIG. 19), where cable 1900 connects with the circuit within enclosure 1810. The cable 1900 can include an interface 1806, which can be a detachable connector (such as a USB connector), via which the cable 1900 connects with interface 1802. Through interface 1802, the puck assembly 1402 can provide power to the electrical circuit within enclosure 1810, where this power is used to drive the coil 1804 in order to inductively charge the electronic device 104.

Figure 19:
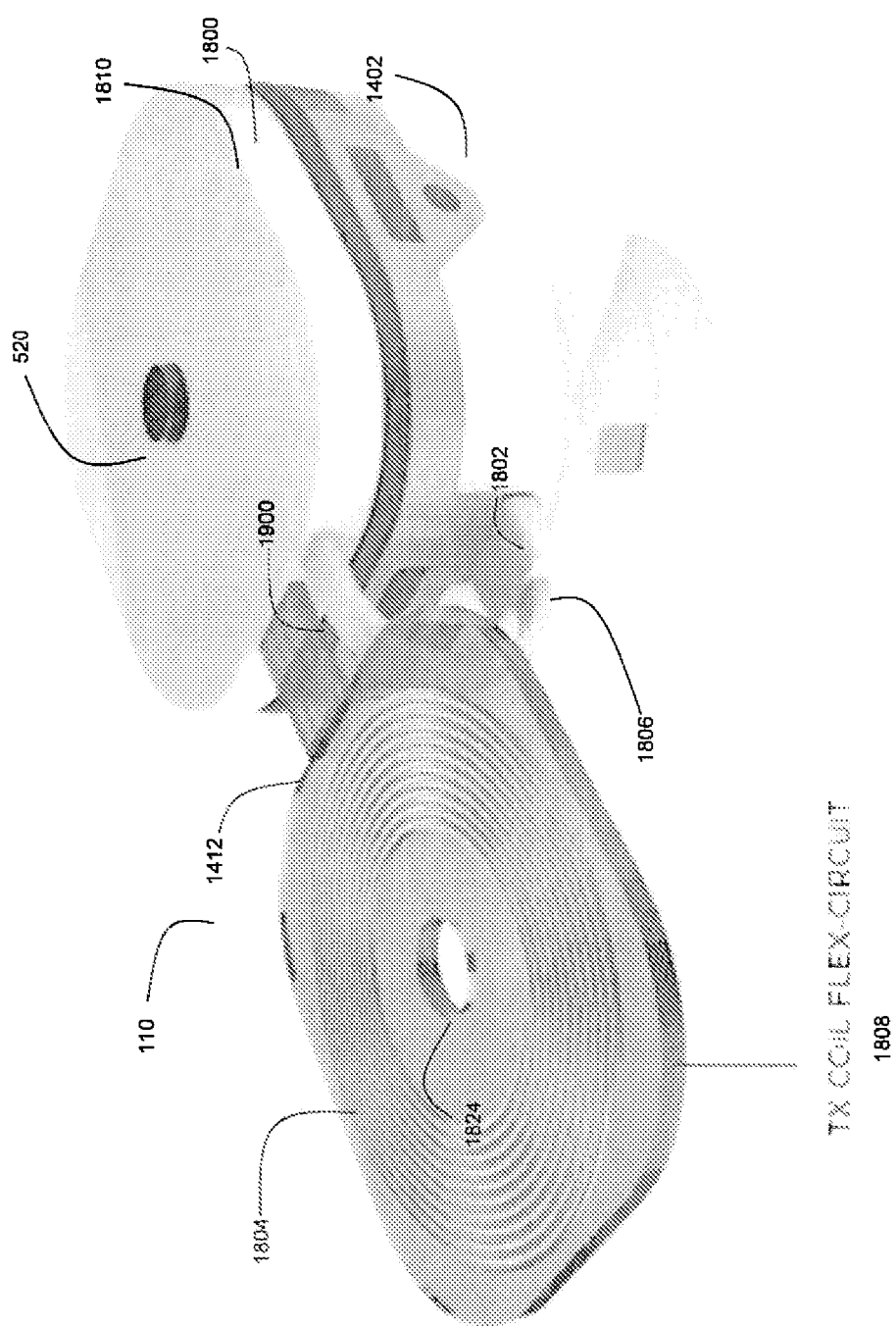
FIG. 19 depicts another view of an example puck assembly with an example embodiment of an adjustably positionable wireless power transmitter.

FIG. 19 shows the wireless power transmitter 110 of FIG. 18 in an assembled configuration with respect to the puck assembly 1402. The cable 1900 that connects the circuit within enclosure 1910 with the circuitry within puck assembly 1402 via interface 1802 can be clearly seen in FIG. 19.

Figure 20:
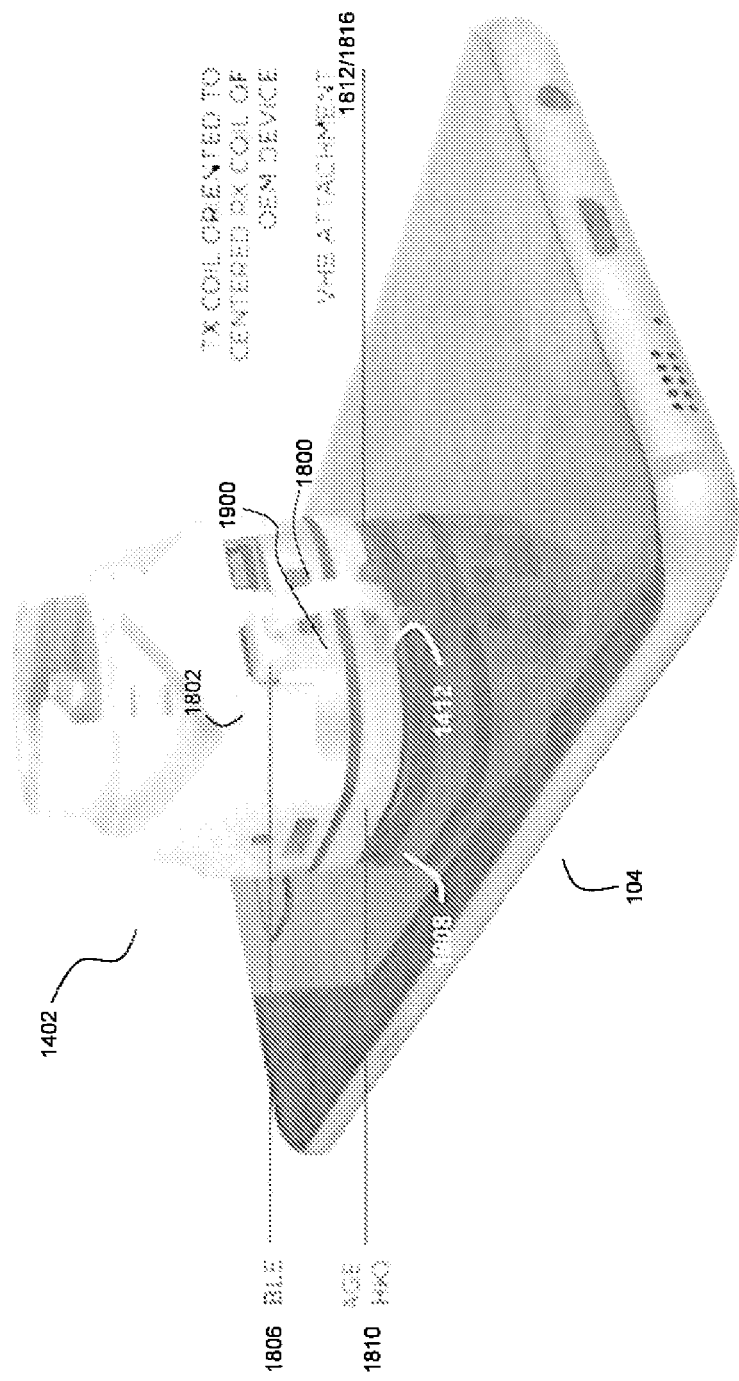
FIG. 20 depicts a bottom view of the puck assembly and adjustably positioned wireless power transmitter in combination with a smart phone.

FIG. 20 shows an underside perspective view of the puck assembly 1402 and wireless power transmitter 110 in combination with an engaged electronic device 104. In this example, the pad 1808 has been adjustably positioned to be located above the puck assembly 1402 (where the adjustable connector 1412 is in a folded position).

Figure 21A:
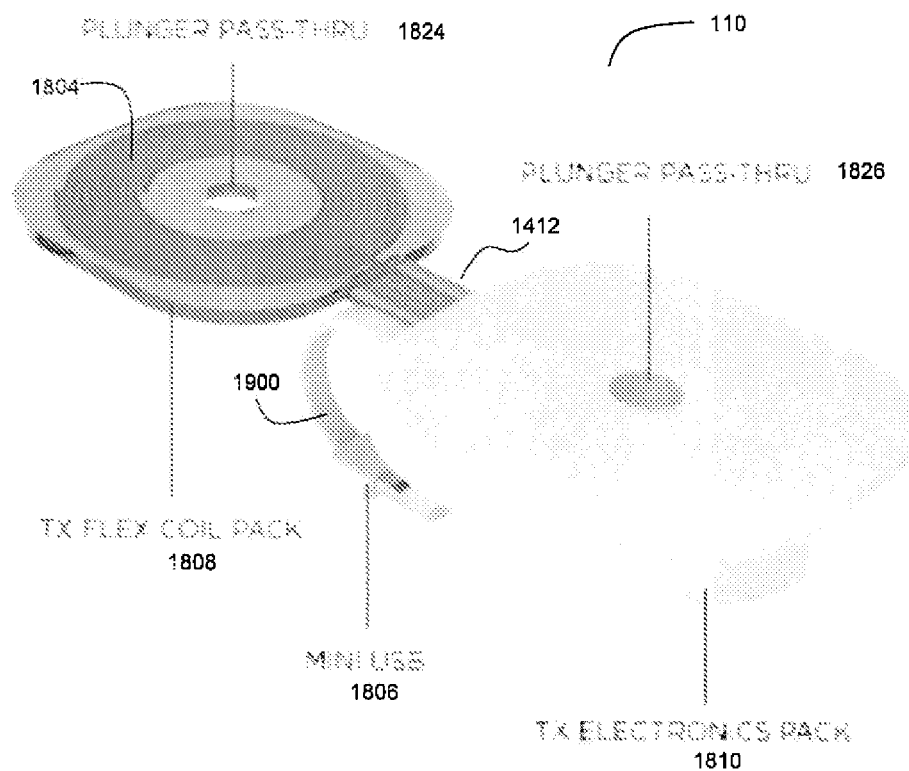
Figure 21B:

FIG. 21A shows a perspective view of the wireless power transmitter 110 sans adhesive pads 1812 and 1816. FIG. 21B shows a side view of the wireless power transmitter 110 of FIG. 21A, from the perspective of the lower right hand corner of FIG. 21A. FIG. 21C shows a top view of the wireless power transmitter 110 of FIG. 21A. FIG. 21C also shows some example dimensions (in mm) for the various components of the adjustably positionable wireless power transmitter 110. FIG. 21D shows a front view of the wireless power transmitter 110 of FIG. 21A, from the perspective of the lower left hand corner of FIG. 21A. FIG. 21D also shows some example dimensions (in mm) for the various components of the wireless power transmitter 110. It should be understood that the dimensions of FIGS. 21C and 21D are only examples and that other dimensions could be used if desired by a practitioner.

Figure 22:
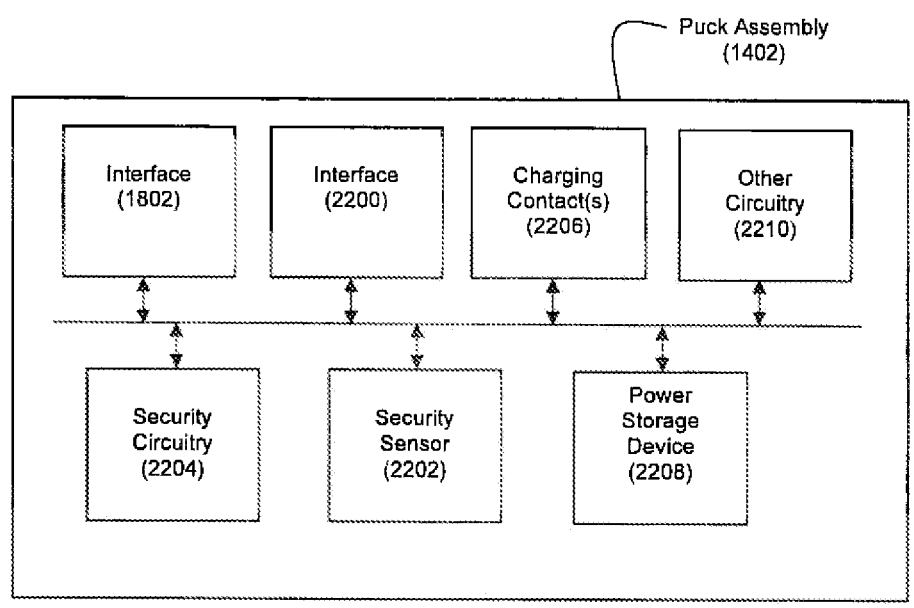
FIG. 22 depicts a component diagram for an example puck assembly.

FIG. 22 depicts an example component diagram for puck assembly 1402, where the puck assembly 1402 includes an interface 2200, interface 1802, security sensor 2202, security circuitry 2204, one or more charging contacts 2206, a power storage device 2208, and additional circuitry 2210. These components can each be enclosed or partially enclosed within a housing of some fashion such as a plastic or composite shell (see, for example, FIG. 18). These components can also be configured to communicate with each other over a bus or similar interconnection.

As explained above, interface 1802 can interface the puck assembly 1402 with the wireless power transmitter 110. For example, the interface 1802 can be a physical connector adapted for detachable connection with a complementary physical connector 1806 of cable 1900 for providing power to the wireless power transmitter 110. However, interface 1802 can also render puck assembly 1402 usable with other techniques for charging the electronic device 104. For example, interface 1802 could be connected with a traditional power cable that is adapted to connect with an input port of the electronic device 104 for delivering electrical power to the electronic device via non-inductive charging. Examples of such power cables are described in the above-referenced and incorporated U.S. Pat. Nos. 8,558,688, 8,698,617, and 8,698,618 and U.S. Patent Application Publication Nos. 2014/0159898 and 2017/003263. Accordingly, it should be understood that the use of a standardized interface 1802 that can be used with not only wireless power transmitter 110 but also a traditional power cable allows the same puck assembly 1402 to be used by practitioners in a wide variety of charging contexts, including inductive charging and non-inductive charging. A practitioner would only need to choose whether to connect the detachable wireless power transmitter 110 or a traditional power cable to interface 1802.

Interface 2200 can be used for interfacing a security fob with the puck assembly 1402 for the purpose of arming and/or disarming the product display assembly 1400. Interface 2200 can be an interface type that is complementary with an interface of the security fob. For example, if the security fob's interface is a mini-USB connector, then interface 2200 can be a complementary mini-USB connector. As another example, if the security fob's interface is an RFID chip, the interface 2200 can be an RFID reader.

The security sensor 2202 can be one or more sensors that are adapted to detect events such as a removal of the electronic device 104 from the puck assembly 1402 or other events that may indicate a possible security condition. An example security sensor 2202 can be a plunger button 1820 included on the puck assembly's upper surface 1406 that is depressed when the electronic device 104 is engaged with the puck assembly 1402 but is released when the electronic device 104 is removed from the puck assembly 1402. A release of the plunger button 1820 can trigger the security circuitry 2204 (when armed) to generate a security condition signal. However, it should be understood that other security sensors 2202 could be employed. Another example of a security sensor 2202 that can be used with product display assemblies 1400 that include a tether assembly 1408 can be a circuit that detects when the tether is cut or otherwise broken. Still another example of a security sensor 2202 can be a position detection circuit that detects when the puck assembly 1402 moves a certain distance beyond the base assembly 1404 or leaves a designated virtual fence area. For example, such a position detection circuit can rely on wireless signals and signal strength estimations to detect distances between the puck assembly 1402 and base assembly 1404. Still additional examples of security sensors 2202 can include power draw sensors, contact closures, optical sensors for detecting objects (or the absence of objects), vibration sensors, and/or acceleration sensors.

The security circuitry 2204 can be any circuitry that is configured to (1) be controllable between a plurality of security states in response to a security code or other arming/disarming instructions from a security fob and (2) generate a security condition signal when appropriate (e.g., when the security circuitry 2204 is in an armed state and the security sensor 2202 detects a triggering event). For example, the security circuitry 2204 can include switching logic and the like that is controlled based on a signal from a control processor that controls the switching logic based on whether a security code has been verified. The security circuitry 2204 may also include circuitry such as relay drivers, motor controls, alarming units, solenoid drivers, and/or lock actuators.

Examples of suitable arrangements with respect to interface 2200, security sensor 2202, security circuitry 2204 and security fobs are described in U.S. Pat. No. 9,892,604 and U.S. Pat. No. 9,959,432, the entire disclosures of each of which are incorporated herein by reference.

The puck assembly 1402 can also include one or more charging contacts 2206. These charging contacts 2206 can create an electrical connection with a power source via complementary contacts of the base assembly 1404 when the puck assembly 1402 is in the rest position. Examples of such charging contacts 2206 are described in the above-referenced and incorporated U.S. Pat. Nos. 8,558,688, 8,698,617, and 8,698,618 and U.S. Patent Application Publication Nos. 2014/0159898 and 2017/003263. However, as noted above, a practitioner may choose to omit such charging contacts 2206 if a wireless interface 150 is employed between the puck assembly 1402 and base assembly 1404.

The puck assembly 1402 can also include a power storage device 2208 that is charged via electricity received through the charging contacts 2206 when the puck assembly 1402 is in the rest position (or via wireless interface 150) and that stores power for use by the puck assembly 1402 when the puck assembly 1402 is in the lift position. The power storage device 2208 can take the form of a battery (preferably a rechargeable battery) or a suitable capacitor. Examples of such a power storage device 2208 are described in the above-referenced and incorporated U.S. Pat. Nos. 8,558,688, 8,698,617, and 8,698,618 and U.S. Patent Application Publication Nos. 2014/0159898 and 2017/003263.

The puck assembly 1402 can also include additional circuitry 2210. For example, the additional circuitry 2210 can include circuitry for distributing power from the charging contacts 2206 to other components of the puck assembly 1402 (e.g., the security circuitry 2204, interfaces 1802 and 2200, power storage device 2208, etc.) and/or circuitry for distributing power from the power storage device 2208 to other components of the puck assembly 1402 (e.g., the security circuitry 2204; interfaces 1802 and 2200). As another example, the additional circuitry 2210 can include wireless communication circuitry that provides the puck assembly with an ability to wirelessly transmit security condition signals from the security circuitry 2204 or otherwise wirelessly communicate with remote systems. Examples of additional circuitry 2210 are described in the U.S. Pat. Nos. 8,558,688, 8,698,617, 8,698,618, 10,251,144, and 10,517,056, the entire disclosure of each of which is incorporated herein by reference.

With reference to FIG. 22 and FIG. 18, it can be appreciated that by virtue of an example embodiment where the wireless power transmitter 110 is detachably connectable with the puck assembly 1402 via interface 1802, practitioners can easily swap out the wireless power transmitter 110 for other charging devices if desired (e.g., a traditional power cable as discussed above). However, it should also be understood that the wireless power transmitter 110 need not be detachable from the puck assembly 1402. For example, if desired, a practitioner could include the driver circuitry as part of the puck assembly 1402, and the pad 1808 can be fixedly attached to the puck assembly 1402 via adjustable connector 1412.

Furthermore, a practitioner may choose to design the wireless power transmitter 110 such that the driver circuit is included in the pad 1808 along with the coil 1804. In such an instance, the adjustable connector 1412 could connect the driver circuit with circuitry in the puck assembly 1402.

Also, while FIG. 18 shows the adjustable connector 1412 as being fixedly attached to the pad 1808 and enclosure 1810, a practitioner could also choose to design the adjustable connector 1412 such that it is detachable from the enclosure 1810 and/or the pad 1808. For example, the adjustable connector 1412 could be a flexible cord or cable that includes a physical interface such as a standardized connector (e.g., USB, mini-USB, USB-C, etc.) at either or both of its ends for connecting with a complementary interface of the pad 1808 and/or enclosure 1810. Further still, in an example embodiment where the pad 1808 is directly connected to the puck assembly 1402 via the adjustable connector 1412, the adjustable connector 1412 could likewise be a detachable adjustable connector.

Further still, while FIG. 18 shows an example of a wireless power transmitter 110 that works in combination with discrete and separable adhesive pads 1812 and 1816, it should be understood that the adhesive could be integral to pad 1808 and/or enclosure 1810, or even omitted entirely, if desired by a practitioner.

Accordingly, it should be understood that the adjustably positionable wireless power transmitter 110 disclosed herein can be used to facilitate the inductive charging of a wide array of electronic devices 104 which might have wireless power receivers 120 located in different areas of the electronic devices 104. For an electronic device 104 with a wireless power receiver in a centered configuration (see, for example, FIG. 17B), the wireless power transmitter 110 can be adjustably positioned to be above the puck assembly 1402 to allow for the electronic device 104 to be presented to customers in a centered and balanced manner while still charging that electronic device 104. For an electronic device 104 with a wireless power receiver 120 in an off-center configuration (see, for example, FIG. 17A), the wireless power transmitter 110 can be adjustably positioned to be away from the puck assembly 1402 to allow for the electronic device 104 to still be presented to customers in a balanced manner while also charging that electronic device 104. Thus, to adapt the product display assembly 1400 to accommodate a different electronic device 104 whose wireless power receiver 120 is located in a different area, a user only needs to adjust the positioning of the wireless power transmitter 110 relative to the enclosure 1810 and/or product display assembly 1400 as needed to better fit the electronic device 104. Moreover, this can be done without any requirement to adjust the positioning of the product display assembly 1400 itself. That is, the product display assembly 1400 can remain in place, while only the wireless power transmitter 110 is adjustably positioned as needed to better fit the electronic device 104.

Also, while the adjustably positionable wireless power transmitter 110 has been described above in the examples of FIGS. 14A-22 for use in combination with a product display assembly 1400, 1500, it should be understood that the adjustably positionable wireless power transmitter 110 can also be used with electronic devices 104 in other contexts. For example, a docking system such as that shown by FIG. 4 could employ an adjustably positionable wireless power transmitter 110 to transmit power from base mount 402 to case mount 404 and/or from case mount 404 to electronic device 104. Further still, the adjustably positionable wireless component need not necessarily be a wireless power transmitter 110. For example, the adjustably positionable wireless component could include both a wireless power transmitter 110 and a wireless data transceiver 112/122. In other example embodiments, a wireless data transceiver 112 in the base position assembly 102 can be adjustably positionable using the techniques discussed above. Similarly, a wireless data transceiver 122 in the intermediary assembly 202 can be adjustably positionable using the techniques discussed above (for communicating with a corresponding wireless data transceiver 112 in the base position assembly 102 and/or a corresponding wireless data transceiver 122 in the electronic device 104). Further still, a wireless power receiver 120 in an intermediary assembly 202 can be adjustably positionable using the techniques described herein for communicating with a corresponding wireless power transmitter 110 in the base position assembly 102. Moreover, a wireless power receiver 120 and/or a wireless data transceiver 122 in the electronic device 104 could also be adjustably positionable using the techniques discussed herein. Moreover, the base position assembly 102 could include an adjustably positionable wireless power transmitter 110 so that an electronic device 104 can be wirelessly powered when resting on the base position assembly 102 (possible via a device attachment 106 as shown by FIG. 1).

While the invention has been described above in relation to its example embodiments, various modifications may be made thereto that still fall within the invention's scope. Such modifications to the invention will be recognizable upon review of the teachings herein.

What is claimed is:

1. An apparatus comprising:
    a base position assembly that includes a wireless power transmitter, a first wireless data transceiver that outputs wireless data as radio frequency signals, and a first lens;
    an intermediary assembly for use with an electronic device, the intermediate assembly having a wireless power receiver, a second wireless data transceiver, and a second lens; and
    a plastic conduit located between the second wireless data transceiver and the second lens,
    wherein the wireless power transmitter provides wireless and non-conductive power transfer to the wireless power receiver, the first lens and the second lens focus the wireless data output from the first wireless data transceiver into the plastic conduit that directs the wireless data to the second wireless data transceiver, and the intermediate assembly transfers the power and the wireless data to the electronic device.

2. The apparatus of claim 1 wherein the wireless power transmitter comprises an inductive transmit coil for inductive power transfer over the interface.

3. The apparatus of claim 1 wherein the wireless data transceiver comprises a near field communication (NFC) transceiver.

4. The apparatus of claim 1 wherein the intermediate assembly includes a surface on which the electronic device can be rested, and wherein the intermediate assembly transfers power and data to the electronic device via a connector cable.

5. The apparatus claim 4 wherein the base position assembly further comprises a second plastic conduit between the wireless data transceiver and the surface, wherein the second plastic conduit propagates the wireless data to the first lens.

6. The apparatus of claim 1 wherein the wireless power transmitter comprises a plurality of inductive coils that are spaced to provide for wireless power transfer through multiple regions of a surface of the base position assembly.

7. The apparatus of claim 1 wherein the wireless data transceiver comprises a plurality of wireless data transceivers that are spaced to provide for wireless data transfer through multiple regions of a surface of the base position assembly.

8. A system comprising:
a base position assembly that includes a wireless power transmitter, a first wireless data transceiver that outputs first wireless data as radio frequency signals, and a first plano-convex lens; and
an intermediary assembly for use with an electronic device, wherein the intermediary assembly includes a wireless power receiver, a second wireless data transceiver that outputs second wireless data in radio frequency signals, and a second plano-convex lens;
wherein the wireless power transmitter defines a wireless and non-conductive interface to wirelessly transfer power to the wireless power receiver via the interface; and
wherein the first plano-convex lens and the second plano-convex lens are positioned with a planar surface of the first plano-convex lens adjacent to a planar surface of the second plano-convex lens to form a convex-convex lens that directs transmission of the first and second wireless data between the first wireless data transceiver and the second wireless data transceiver.

9. The system of claim 8 wherein the wireless power transmitter comprises an inductive transmit coil for inductive power transfer, and wherein the wireless power receiver comprises an inductive receive coil for inductive power transfer.

10. The system of claim 8 wherein the first and second wireless data transceivers comprise near field communication (NFC) transceivers.

11. The system of claim 8 wherein the base position assembly includes a surface on which the intermediary assembly and the electronic device can be rested, and wherein the wireless power transmitter and the first wireless data transceiver are configured to wirelessly transfer power and data to the intermediary assembly in a rest position on the surface.

12. The system of claim 11 wherein the base position assembly further comprises a conduit between the base position assembly's extremely high frequency NFC transceiver and the surface, wherein the conduit propagates the wireless data through the interface.

13. The system of claim 11 wherein the intermediary assembly includes a surface that contacts the base position assembly surface when the intermediary assembly and the electronic device are in the rest position, and wherein the intermediary assembly further comprises a plastic conduit located between the second wireless data transceiver and the intermediary assembly surface, wherein the plastic conduit propagates the first and second wireless data between the first wireless data transceiver and the second wireless data transceiver.

14. A method comprising:
inductively charging an electronic device over a wireless and non-conductive interface between a wireless power transmitter located in a base position assembly and a wireless power receiver located in the electronic device or an intermediary assembly; and
wirelessly communicating wireless data as radio frequency signals over a wireless and non-conductive interface between a first wireless data transceiver located in the base position assembly and a second wireless data transceiver located in the electronic device or the intermediary assembly, wherein the wireless and non-conductive interface includes a plastic conduit and a convex-convex lens, the convex-convex lens directing transmission of the wireless data within the plastic conduit between the first wireless data transceiver and the second wireless data transceiver.

15. The method of claim 14 wherein the base position assembly is part of a retail security position for merchandising the electronic device to customers.

16. The method of claim 14 wherein the base position assembly is part of a docking system for the electronic device.

17. The method of claim 14 wherein the wireless power transmitter comprises a first inductive coil, wherein the wireless power receiver comprises a second inductive coil, and wherein the inductively charging includes inductively coupling the first and second inductive coils.

18. The method of claim 14 wherein the first wireless data transceiver comprises a first extremely high frequency (EHF) near field transceiver, and wherein the second wireless data transceiver comprises a second EHF near field transceiver.

19. The method of claim 18 wherein the electronic device or intermediary assembly comprises a wireless signal conduit, and wherein the wirelessly communicating data comprises propagating a wireless data signal between the first and second EHF near field transceivers via the conduit.

20. The method of claim 14 wherein the wirelessly communicating data comprises focusing the wireless data signal to the second second wireless data transceiver via the convex-convex lens.

* * * * *